(12) United States Patent
Ratnakaram et al.

(10) Patent No.: US 12,169,837 B2
(45) Date of Patent: Dec. 17, 2024

(54) VERIFYING EXTERNAL ACCOUNTS IN REAL-TIME USING DYNAMIC SMART CONTRACTS

(71) Applicant: Bank of America Corporation, Charlotte, NC (US)

(72) Inventors: Udaya Kumar Raju Ratnakaram, Telangana (IN); Puneetha Polasa, Telangana (IN); Sandeep Kumar Chauhan, Hyderabad (IN); Bhagya Lakshmi Sudha Lavanya Mallidi, Hyderabad (IN); Prashanthi Jambula, Hyderabad (IN); Shravan Kumar Kondoju, Hyderabad (IN)

(73) Assignee: Bank of America Corporation, Charlotte, NC (US)

(*) Notice: Subject to any disclaimer, the term of this patent is extended or adjusted under 35 U.S.C. 154(b) by 370 days.

(21) Appl. No.: 17/507,126

(22) Filed: Oct. 21, 2021

(65) Prior Publication Data
US 2023/0131232 A1 Apr. 27, 2023

(51) Int. Cl.
*G06Q 20/40* (2012.01)
*G06Q 20/22* (2012.01)
*G06Q 20/38* (2012.01)
*G06Q 40/02* (2023.01)
*H04L 9/40* (2022.01)

(52) U.S. Cl.
CPC ....... *G06Q 20/4014* (2013.01); *G06Q 20/223* (2013.01); *G06Q 20/389* (2013.01); *G06Q 20/405* (2013.01); *G06Q 40/02* (2013.01); *H04L 63/126* (2013.01); *G06Q 2220/00* (2013.01)

(58) Field of Classification Search
None
See application file for complete search history.

(56) References Cited

U.S. PATENT DOCUMENTS

| 10,135,870 B2 | 11/2018 | Castinado et al. |
| 10,782,998 B2 | 9/2020 | Qiu |
| 10,880,074 B2 | 12/2020 | Revankar et al. |
| 10,963,400 B2 | 3/2021 | Deshpande et al. |

(Continued)

FOREIGN PATENT DOCUMENTS

WO 2020168564 A1 8/2020

*Primary Examiner* — Courtney P Jones
*Assistant Examiner* — Christine Dang
(74) *Attorney, Agent, or Firm* — Banner & Witcoff, Ltd.

(57) ABSTRACT

Aspects of the disclosure relate to verifying external accounts in real-time using dynamic smart contracts. A computing platform may receive a consumer request to initiate a transaction, at an enterprise organization, with an entity associated with an account. The computing platform may use the received consumer request to generate a smart contract profile associated with the entity. The computing platform may use the smart contract profile associated with the entity to determine a trust score associated with the entity. The computing platform may gather data indicating external accounts associated with the entity. The computing platform may use the data indicating the external accounts associated with the entity to determine a confidence threshold value. The computing platform may compare the trust score associated with the entity to the confidence threshold value to verify the legitimacy of the account associated with the entity.

20 Claims, 13 Drawing Sheets

(56) References Cited

U.S. PATENT DOCUMENTS

| | | | | |
|---|---|---|---|---|
| 11,270,311 | B1* | 3/2022 | Jass | G06Q 20/388 |
| 2011/0238575 | A1* | 9/2011 | Nightengale | H04L 61/5007 |
| | | | | 705/44 |
| 2014/0279544 | A1* | 9/2014 | Baird | G06Q 20/322 |
| | | | | 705/44 |
| 2015/0142595 | A1* | 5/2015 | Acuna-Rohter | G06Q 20/40 |
| | | | | 705/21 |
| 2017/0076292 | A1* | 3/2017 | Schmitz | G06Q 20/4016 |
| 2017/0140408 | A1 | 5/2017 | Wuehler | |
| 2019/0182257 | A1* | 6/2019 | Lee | G06Q 10/06315 |
| 2020/0021598 | A1* | 1/2020 | Lee | G06Q 20/10 |
| 2020/0210996 | A1 | 7/2020 | Edwards et al. | |
| 2021/0192526 | A1* | 6/2021 | Kuchar | G06Q 20/065 |
| 2022/0122195 | A1* | 4/2022 | Alameddine | G06F 21/31 |
| 2022/0245643 | A1* | 8/2022 | Venkatasubramaniam | |
| | | | | G06N 3/08 |
| 2022/0417008 | A1* | 12/2022 | Shrivastava | H04L 9/3247 |
| 2023/0069223 | A1* | 3/2023 | Patel | G06Q 20/065 |
| 2023/0092557 | A1* | 3/2023 | Wasti | H04L 63/083 |
| | | | | 726/6 |

* cited by examiner

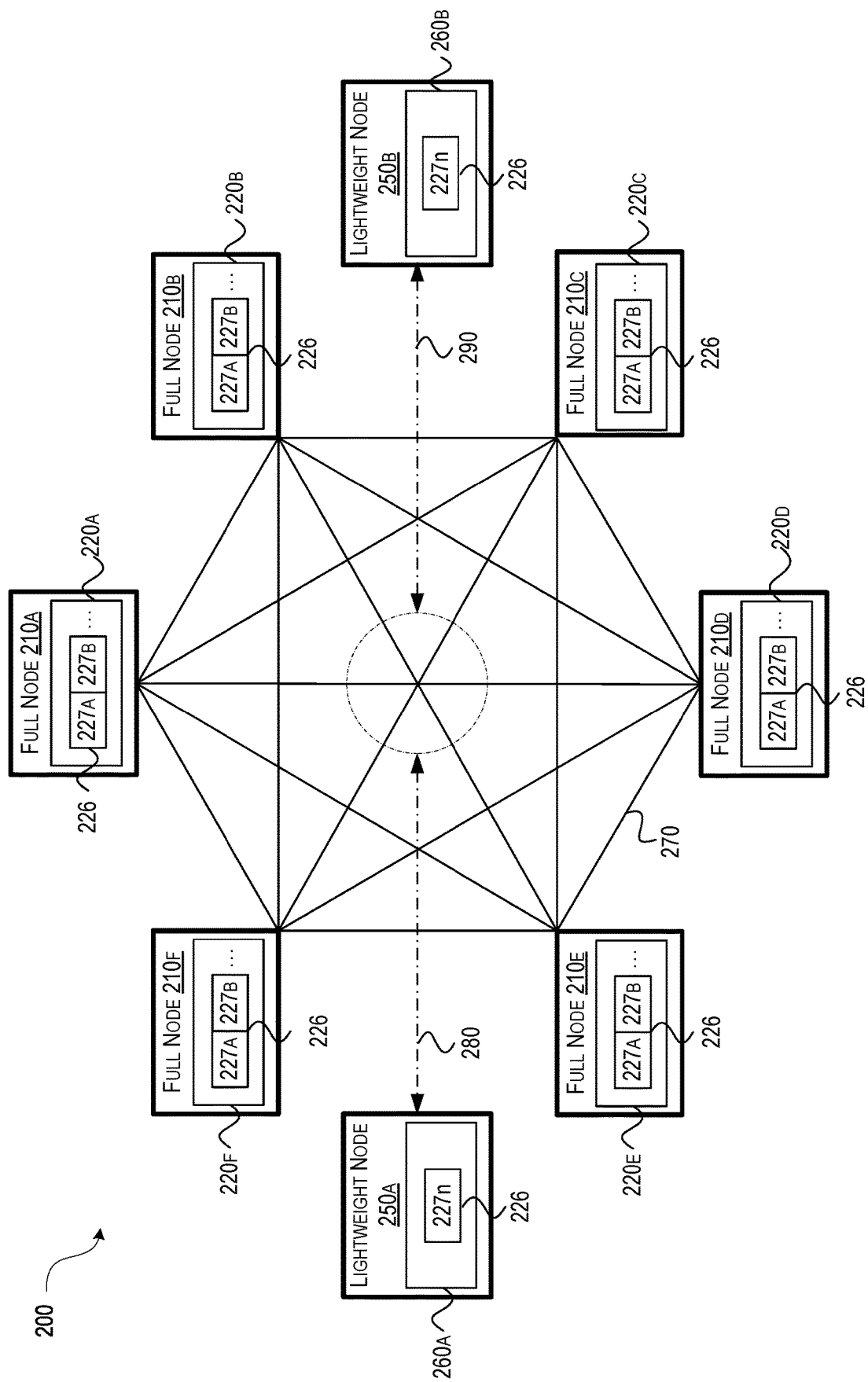

Consumer Request

Consumer Name: Last Name 1, First Name 1

Consumer Address: Street Name 1, City, State, Zip Code

Consumer Account Number: AAAAAAA

Transaction Request: Transfer $2,000 to account number BBBBBBB

Recipient Entity Name: Last Name 2, First Name 2

Recipient Entity Address: Street Name 2, City, State, Zip Code

Recipient Entity Account Number: BBBBBBB

FIG. 6

Consumer Request

Consumer Name: Last Name 1, First Name 1

Consumer Address: Street Name 1, City, State, Zip Code

Consumer Account Number: AAAAAAA

Transaction Request: Transfer $1,000 to account number CCCCCCC

Recipient Entity Name: Entity 1

Recipient Entity Address: Street Name 3, City, State, Zip Code

Recipient Entity Account Number: CCCCCCC

Recipient Entity Branch Code: DDD

FIG. 7

Consumer Request

Consumer Name: Entity 2
Consumer Address: Street Name 4, City, State, Zip Code
Consumer Account Number: EEEEEEE
Consumer Branch Code: FFF

Transaction Request: Access to account number BBBBBBB – an analysis of account activity and standing is required prior to processing a loan application filed by the recipient entity indicated below

Recipient Entity Name: Last Name 2, First Name 2
Recipient Entity Address: Street Name 2, City, State, Zip Code
Recipient Entity Account Number: BBBBBBB

FIG. 8

Consumer Request

Consumer Name: Entity 2
Consumer Address: Street Name 4, City, State, Zip Code
Consumer Account Number: EEEEEEE
Consumer Branch Code: FFF

Transaction Request: Access to account number CCCCCCC – an analysis of account activity and standing is required prior to processing a loan application filed by the recipient entity indicated below

Recipient Entity Name: Entity 1
Recipient Entity Address: Street Name 3, City, State, Zip Code
Recipient Entity Account Number: CCCCCCC
Recipient Branch Code: DDD

FIG. 9

| Smart Contract Profile | |
|---|---|
| Recipient Entity Contact Information: | - Via telephone, (XXX)XXX-XXXX<br>- Via email, first.last@entity.net |
| Enterprise Records: | - Associated with account number AAAAAAA<br>- Associated with account number CCCCCCC<br>- Failed Transactions: 15 of 35<br>- Successful Transactions: 20 of 35 |
| Web-Based Relationship(s) with the Consumer: | - Connected on Social Media Platform 1<br>- Friends on Social Media Platform 2<br>- Send emails daily using Communication Platform 1 and Communication Platform 2 |
| Enterprise Rules: | - Accounts that are not in good standing are weighted more than accounts in good standing<br>- Closed accounts are not weighted<br>- Accounts should be open and active for at least 48 hours before engaging in a transaction |

FIG. 10

VERIFYING EXTERNAL ACCOUNTS IN REAL-TIME USING DYNAMIC SMART CONTRACTS

BACKGROUND

Aspects of the disclosure relate to hardware and software for verifying external accounts in real-time using dynamic smart contracts. In particular, one or more aspects of the disclosure relate to using a smart contract profile that describes an entity associated with a recipient account and a trust score associated with the entity to verify the legitimacy of the recipient account associated with the entity.

Current external account verification protocols within financial institutions require consumers to demonstrate the legitimacy of the recipient account associated with an entity prior to initiating a transaction with the entity. Consumers may be required to submit verification documentation and/or to execute additional transactions prior to receiving clearance from the financial institution to initiate the transaction with the entity associated with the recipient account. To demonstrate the legitimacy of the recipient account, the financial institution may require the consumer to (1) deposit currency into the recipient account or (2) provide a voided check associated with the recipient account. Performing either one of (1) or (2) for each transaction may require the financial institution to analyze either the additional transactions or the submitted documentation prior to determining the legitimacy of the recipient account and prior to deciding whether to approve or deny the consumer request to initiate the transaction with the entity associated with the recipient account. As such, current external account verification protocols do not permit the financial institution to make real-time, informed decisions in response to consumer requests to initiate a transaction with the entity associated with the recipient account.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, and convenient technical solutions that address and overcome the technical problems associated with verifying external accounts in real-time using dynamic smart contracts.

In accordance with one or more embodiments, a method may comprise, at a computing device configured to operate in a peer-to-peer (P2P) network and including at least one processors and memory storing at least a portion of a blockchain of the P2P network, receiving data that describes a consumer request to initiate a transaction with an entity associated with an account. The method may comprise generating, using the received data that describes the consumer request, a smart contract entity profile associated with the entity associated with the account. The method may comprise determining, based on the smart contract entity profile, a trust score associated with the entity associated with the account. The method may comprise receiving data indicating additional accounts associated with the entity. The method may comprise determining, based on the data indicating the additional accounts associated with the entity, a confidence threshold value. The method may comprise transmitting, to the memory storing at least the portion of the blockchain, the smart contract entity profile associated with the entity associated with the account and the trust score associated with the entity associated with the account. The method may comprise generating, on the blockchain of the P2P network, a block containing the smart contract entity profile associated with the entity associated with the account and the trust score associated with the entity associated with the account. The method may comprise comparing the trust score to the confidence threshold value. The method may comprise transmitting a notification, wherein the notification indicates one of: a successful verification of the account associated with the entity or a failed verification of the account associated with the entity.

In accordance with one or more embodiments, a computing platform may comprise at least one processor, a communication interface communicatively coupled to the at least one processor, and memory storing at least a portion of a blockchain in a peer-to-peer (P2P) network and computer-readable instructions that, when executed by the at least one processor, cause the computing platform to receive data that describes a consumer request to initiate a transaction with an entity associated with an account. The computing platform may generate, using the received data that describes the consumer request, a smart contract entity profile associated with the entity associated with the account. The computing platform may determine, based on the smart contract entity profile, a trust score associated with the entity associated with the account. The computing platform may receive data indicating additional accounts associated with the entity. The computing platform may determine, based on the data indicating the additional accounts associated with the entity, a confidence threshold value. The computing platform may transmit, to the memory storing at least the portion of the blockchain in the P2P network, the smart contract entity profile associated with the entity associated with the account and the trust score associated with the entity associated with the account. The computing platform may generate, on the blockchain in the P2P network, a block containing the smart contract entity profile associated with the entity associated with the account and the trust score associated with the entity associated with the account. The computing platform may compare the trust score to the confidence threshold value. The computing platform may transmit a notification, wherein the notification indicates one of a successful verification of the account associated with the entity or a failed verification of the account associated with the entity.

In accordance with one or more embodiments, one or more non-transitory computer-readable media storing instructions that, when executed by a computing platform comprising at least one processor, memory storing at least a portion of a blockchain in a peer-to-peer (P2P) network, and a communication interface, cause the computing platform to receive data that describes a consumer request to initiate a transaction with an entity associated with an account. The instructions, when executed, may cause the computing platform to generate, using the received data that describes the consumer request, a smart contract entity profile associated with the entity associated with the account. The instructions, when executed, may cause the computing platform to determine, based on the smart contract entity profile, a trust score associated with the entity associated with the account. The instructions, when executed, may cause the computing platform to receive data indicating additional accounts associated with the entity. The instructions, when executed, may cause the computing platform to determine, based on the data indicating the additional accounts associated with the entity, a confidence threshold value. The instructions, when executed, may cause the computing platform to transmit, to the memory storing at least the portion of the blockchain in the P2P network, the smart contract entity profile associated with the entity associated with the account and the trust score associated with the entity associated with the account. The instructions, when executed, may cause the computing platform to generate, on the blockchain in the P2P network, a block containing the smart contract entity profile associated with the entity associated with the account and the trust score associated with the entity associated with the account. The instructions, when executed, may cause the computing platform to compare the trust score to the confidence threshold value. The instructions, when executed, may cause the computing platform to transmit a notification, wherein the notification indicates one of a successful verification of the account associated with the entity or a failed verification of the account associated with the entity.

These features, along with many others, are discussed in greater detail below.

BRIEF DESCRIPTION OF THE DRAWINGS

The present disclosure is illustrated by way of example and is not limited in the accompanying figures in which like reference numerals indicate similar elements and in which:

FIG. 2 depicts an illustrative example of a decentralized P2P computer system that may be used for verifying external accounts in real-time using dynamic smart contracts in accordance with one or more example embodiments;

FIGS. 6-9 depict illustrative consumer requests for verifying external accounts in real-time using dynamic smart contracts in accordance with one or more example embodiments; and FIG. 10 depicts an illustrative smart contract profile for verifying external accounts in real-time using dynamic smart contracts in accordance with one or more example embodiments.

DETAILED DESCRIPTION

Figure 1A:
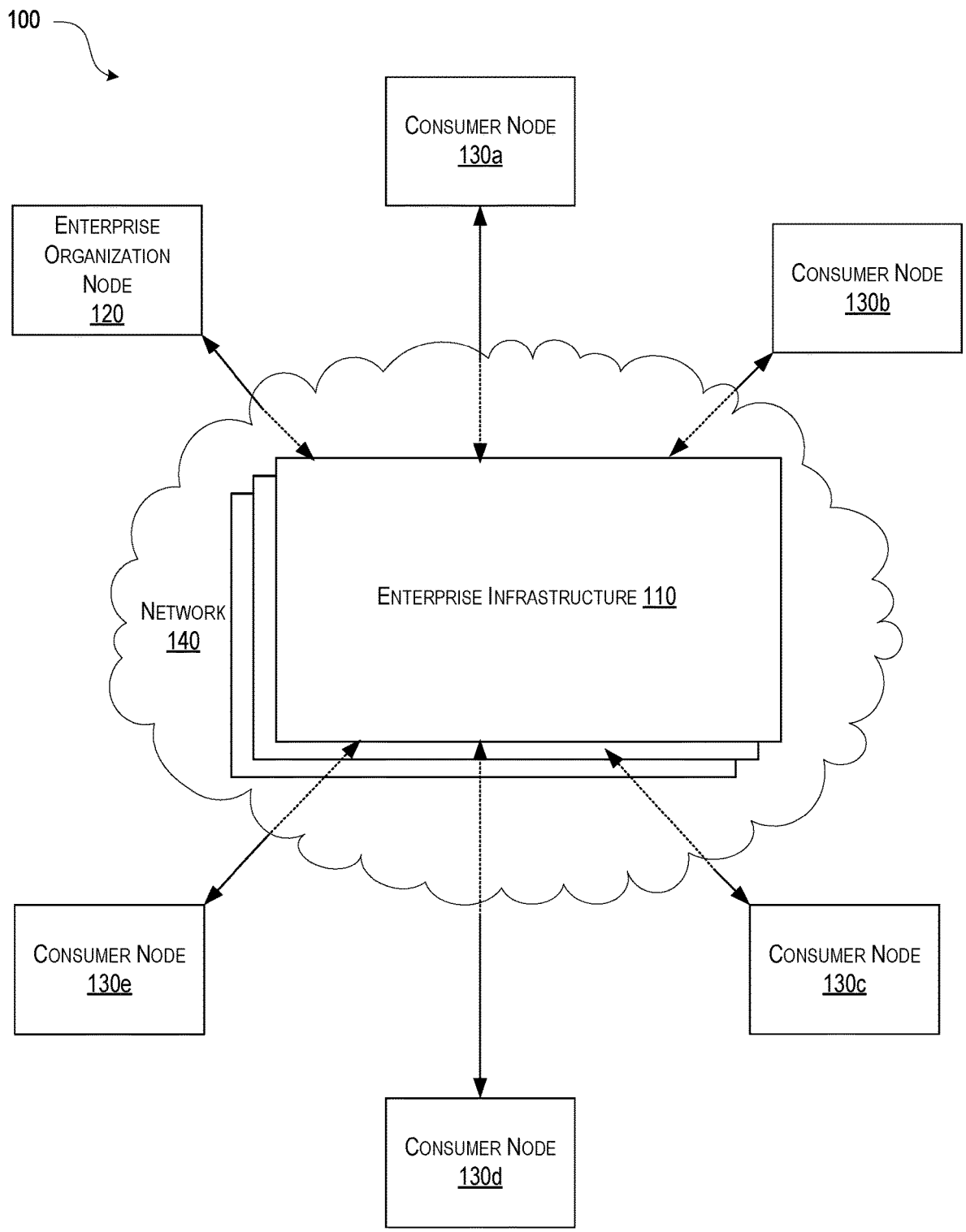
FIG. 1A depicts an illustrative example of a computer system for verifying external accounts in real-time using dynamic smart contracts in accordance with one or more example embodiments.

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural and functional modifications may be made, without departing from the scope of the present disclosure. Various aspects are capable of other embodiments and of being practiced or being carried out in various different ways.

It is noted that various connections between elements are discussed in the following description. It is noted that these connections are general and, unless specified otherwise, may be direct or indirect, wired or wireless, and that the specification is not intended to be limiting in this respect.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As discussed above, current external account verification protocols within financial institutions require consumers to demonstrate the legitimacy of the recipient account associated with an entity prior to initiating a transaction with the entity. Accordingly, proposed herein is a solution to the problem described above that includes verifying external accounts in real-time, or near real-time, using dynamic smart contracts. For example, dynamic smart contract entity profiles may be stored and distributed within a blockchain network. The blockchain network may contain an enterprise organization node, a consumer node, a smart contract node, a trust score node, an external account processing node, and an external account verification node. The smart contract node may generate a smart contract profile for the entity associated with the recipient account. The trust score node may use the data within the smart contract profile to determine a trust score associated with the entity. The external account processing node may gather and analyze additional accounts associated with the entity. The external account verification node may use data describing the additional accounts associated with the entity to determine a confidence threshold value. The external account verification node may compare the trust score associated with the entity to the confidence threshold value to determine whether the recipient account associated with the entity is successfully verified.

The disclosure provided herein is described, at least in part, in relation to a decentralized peer-to-peer (e.g., P2P) system specialized for the purpose of managing a blockchain. The decentralized P2P system may be comprised of computing devices that are distributed in multiple locations across a geographical area as opposed to a single location such as a business or company. The computing devices forming the decentralized P2P system may operate with each other to manage a blockchain, which may be a data structure used to store information related to the decentralized P2P system. More specifically, the blockchain may be a chronological linkage of data elements (e.g., blocks) which store data records relating to the decentralized computing system.

A consumer may access the decentralized P2P system through a specialized "wallet" (i.e., Identity Wallet) that may uniquely identify the consumer and enable the consumer to perform functions related to the decentralized P2P network. Through the wallet, the consumer may be able to hold currency, submit transaction requests to an enterprise organization, or any other function associated with the decentralized P2P system. Furthermore, the consumer may use the wallet to request performance of network-specific functions related to the decentralized P2P system such as fund transfers, asset transfers, and/or loan processing. The various computing devices forming the decentralized P2P computing system may operate as a team to perform network-specific functions requested by the consumer. In performing the network-specific functions, the various computing devices may produce blocks that store the data generated during the performance of the network-specific functions and may add the blocks to the blockchain. After the block has been added to the blockchain, the wallet associated with the consumer may indicate that the requested network-specific function has been performed.

For example, a consumer's wallet may contain identification documentation associated with the consumer. The consumer may use the identification documentation in the wallet to submit, to an enterprise organization, a request to initiate a transaction (e.g., a request to transfer funds to an account associated with an entity). The consumer may submit the request to transfer funds to an account associated with an entity to the decentralized P2P system. The various computing devices forming the decentralized P2P computing system may extract the identification documentation from the wallet and may process the consumer request. In doing so, a block may be created by the various computing devices of the decentralized P2P computing system. The block may store data indicating that the request to transfer funds to an account associated with the entity was submitted to the enterprise organization. The various computing devices may add the block to the blockchain. The wallet associated with the consumer may reflect the submission of the request to transfer funds.

In more detail, the decentralized P2P system may be specialized for the purpose of managing a distributed ledger, such as a private blockchain or a public blockchain, through the implementation of digital cryptographic hash functions, consensus algorithms, digital signature information, and network-specific protocols and commands. The decentralized P2P system (e.g., decentralized system) may be comprised of decentralized system infrastructure consisting of a plurality of computing devices, either of a heterogeneous or homogenous type, which serve as network nodes (e.g., full nodes and/or lightweight nodes) to create and sustain a decentralized P2P network (e.g., decentralized network). Each of the full network nodes may have a complete replica or copy of a blockchain stored in memory and may operate in concert, based on the digital cryptographic hash functions, consensus algorithms, digital signature information, and network-specific protocols, to execute network functions and/or maintain inter-nodal agreement as to the state of the blockchain. Each of the lightweight network nodes may have at least a partial replica or copy of the blockchain stored in memory and may request performance of network functions through the usage of digital signature information, hash functions, and network commands. In executing network functions of the decentralized network, such as consumer-initiated transaction requests and smart contract operations, at least a portion of the full nodes forming the decentralized network may execute the one or more cryptographic hash functions, consensus algorithms, and network-specific protocols to register a requested network function on the blockchain. In some instances, a plurality of network function requests may be broadcasted across at least a portion of the full nodes of the decentralized network, aggregated through execution of the one or more digital cryptographic hash functions, and validated by performance of the one or more consensus algorithms to generate a single work unit (e.g., block), which may be added in a time-based, chronological manner to the blockchain through performance of network-specific protocols.

While in practice the term "blockchain" may hold a variety of contextually derived meanings, the term blockchain, as used herein, refers to a concatenation of sequentially dependent data elements (e.g., blocks) acting as a data ledger that stores records relating to a decentralized computing system. Such data records may be related to those used by a particular entity or enterprise, such as a financial institution, and/or may be associated with a particular application and/or use case including, but not limited to, fund transfers, financial loan requests, cryptocurrency, digital content storage and delivery, entity authentication and authorization, digital identity, marketplace creation and operation, internet of things (IoT), prediction platforms, currency exchange and remittance, P2P transfers, ride sharing, and precious metal and work of art registration and transference, among others. A "private blockchain" may refer to a blockchain of a decentralized private system in which only authorized computing devices are permitted to act as nodes in a decentralized private network and have access to the private blockchain. In some instances, the private blockchain may be viewable and/or accessible by authorized computing devices which are not participating as nodes within the decentralized private network, but still have proper credentials. A "public blockchain" may refer to a blockchain of a decentralized public system in which any computing devices may be permitted to act as nodes in a decentralized public network and have access to the public blockchain. In some instances, the public blockchain may be viewable and/or accessible by computing devices which are not participating as nodes within the decentralized public network.

Further, a "full node" or "full node computing device," as used herein, may describe a computing device in a decentralized system which operates to create and maintain a decentralized network, execute requested network functions, and maintain inter-nodal agreement as to the state of the blockchain. In order to perform such responsibilities, a computing device operating as a full node in the decentralized system may have a complete replica or copy of the blockchain stored in memory, as well as executable instructions for the execution of hash functions, consensus algorithms, digital signature information, network protocols, and network commands. A "lightweight node," "light node," "lightweight node computing device," or "light node computing device" may refer to a computing device in a decentralized system which may request the performance of network functions (e.g., consumer-initiated transaction requests, smart contract operations, and the like) within a decentralized network, but might not be capable of executing the requested network functions or maintaining inter-nodal agreement as to the state of the blockchain. As such, a computing device operating as a lightweight node in the decentralized system may have a partial replica or copy of the blockchain. In some instances, network functions, requested by lightweight nodes, to be performed by the decentralized network may also be requested by full nodes in the decentralized system.

"Network functions" and/or "network-specific functions," as described herein, may relate to functions which are able to be performed by nodes of a decentralized P2P network. In some arrangements, the data generated in performing network-specific functions may be stored on a blockchain associated with the decentralized P2P network. Examples of network functions may include "smart contract operations" and/or "consumer-initiated transaction requests." A smart contract operation, as used herein, may describe one or more operations performed by a "smart contract," which may be one or more algorithms and/or programs associated with one or more nodes within a decentralized P2P network. An enterprise organization transaction request may describe a request, submitted by a consumer, to initiate a transaction at the enterprise organization and may be associated with one or more nodes within a decentralized network.

Computer Architecture

FIG. 1A depicts an illustrative example of a computer system 100 that may be used for verifying external accounts in real-time, or near real-time, using dynamic smart contracts. Centralized computer system 100 may comprise one or more computing devices including at least enterprise infrastructure 110, enterprise organization node 120, and consumer nodes 130a-130e. While FIG. 1A depicts more than one consumer node (e.g. consumer nodes 130a-130e), each of consumer nodes 130a-130e may be configured in accordance with the features described herein. While the description herein may make reference to consumer node 130, it is important to note that the functions described in connection with consumer node 130 may also be performed by any one of consumer nodes 130a-130e. Each one of consumer nodes 130a-130e and enterprise organization node 120 may be configured to communicate with enterprise infrastructure 110 through network 140. In some arrangements, centralized computer system 100 may include additional computing devices and networks that are not depicted in FIG. 1A, which may also be configured to interact with enterprise infrastructure 110 and, in some instances, consumer node 130.

Enterprise infrastructure 110 may be associated with a distinct entity such as an enterprise organization, company, school, government, and the like, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. Enterprise infrastructure 110 may include computing hardware and software that may host various data and applications for performing tasks of the centralized entity and interacting with consumer node 130, as well as other computing devices. As discussed in greater detail below in connection with FIG. 1B, enterprise infrastructure 110 may use smart contract node 111, trust score node 112, external account processing node 113, external account verification node 114, enterprise organization reference database 115, smart contract profile database 116, and external accounts database 117 to verify the legitimacy of the recipient account associated with the entity. Each computing device within enterprise infrastructure 110 may contain processor(s) 118 and database 119, which may be stored in memory of the one or more computing devices of enterprise infrastructure 110. Through execution of computer-readable instructions stored in memory, the computing devices of enterprise infrastructure 110 may be configured to perform functions of the centralized entity and store the data generated during the performance of such functions in database 119.

In some arrangements, enterprise infrastructure 110 may include and/or be part of enterprise information technology infrastructure and may host a plurality of enterprise applications, enterprise databases, and/or other enterprise resources. Such applications may be executed on one or more computing devices included in enterprise infrastructure 110 using distributed computing technology and/or the like. In some instances, enterprise infrastructure 110 may include a relatively large number of servers that may support operations of the enterprise organization, such as a financial institution. Enterprise infrastructure 110, in this embodiment, may generate a single centralized ledger for data received from consumer node 130, which may be stored in databases 118.

Consumer node 130 may be configured to interact with enterprise infrastructure 110 through network 140. In some instances, consumer node 130 may be configured to receive and transmit information corresponding to system requests through particular channels and/or representations of webpages and/or applications associated with enterprise infrastructure 110. The system requests provided by consumer node 130 may initiate the performance of particular computational functions such as data and/or file transfers at enterprise infrastructure 110. In such instances, consumer node 130 may be an internal computing device associated with the particular entity corresponding to enterprise infrastructure 110 and/or may be an external computing device which is not associated with the particular entity.

As stated above, computer system 100 also may include one or more networks, which may interconnect one or more of enterprise infrastructure 110, consumer node 130, and enterprise organization node 120. For example, centralized computer system 100 may include network 140. Network 140 may include one or more sub-networks (e.g., local area networks (LANs), wide area networks (WANs), or the like). Furthermore, computer system 100 may include a local network configured to interconnect each of the computing devices comprising enterprise infrastructure 110.

Figure 1B:
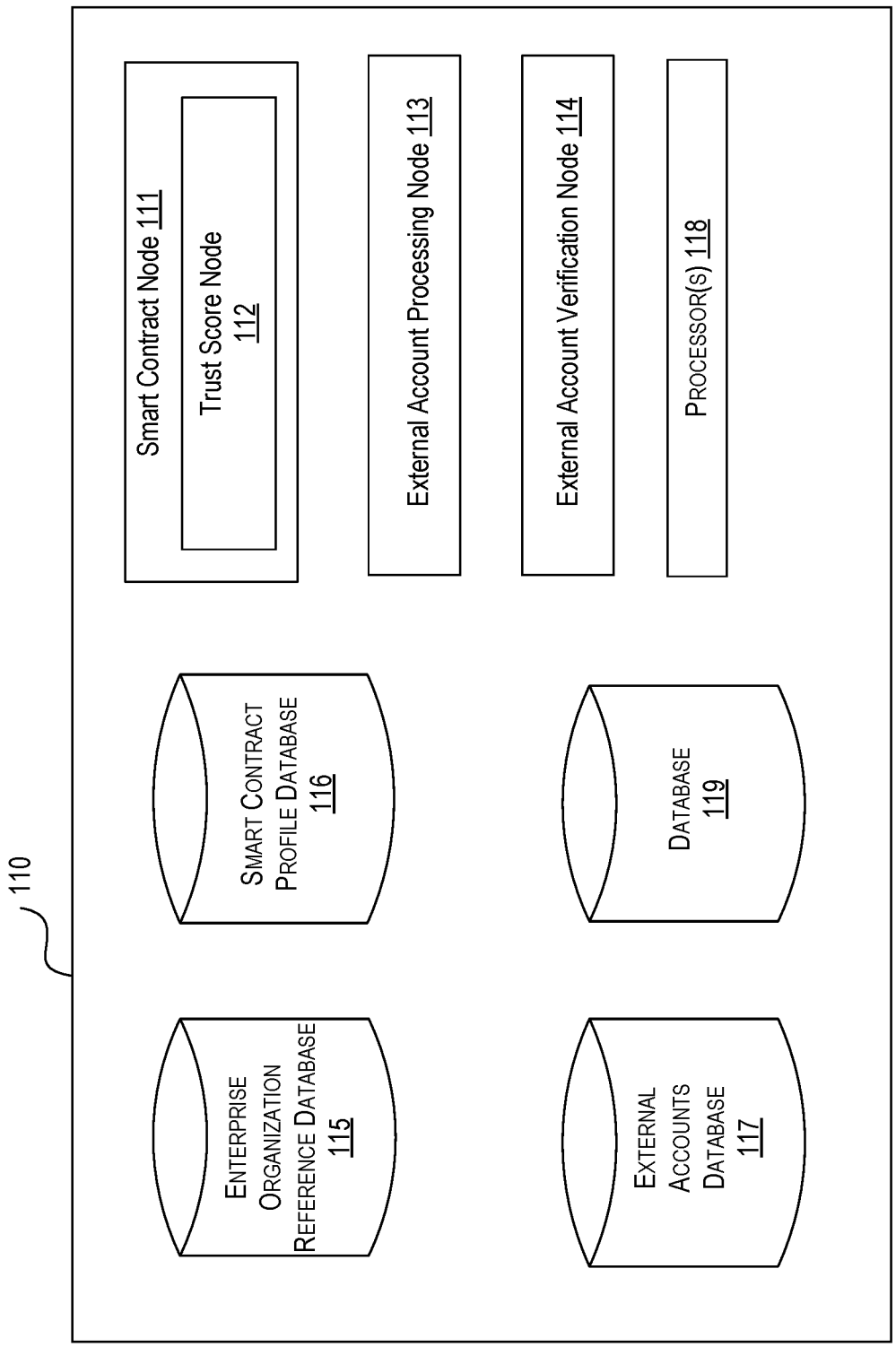
FIG. 1B depicts an illustrative example of the enterprise infrastructure that may be used for verifying external accounts in real-time using dynamic smart contracts in accordance with one or more example embodiments.

FIG. 1B depicts the components of enterprise infrastructure 110 that may be used for verifying external accounts in real-time, or near real-time, using dynamic smart contracts. As discussed in connection with FIG. 1A, enterprise infrastructure 110 may contain smart contract node 111, trust score node 112, external account processing node 113, external account verification node 114, enterprise organization reference database 115, smart contract profile database 116, external accounts database 117, processor(s) 118, and database 119. Smart contract node 111 may receive, from enterprise organization node 120, data that was extracted from a consumer request to initiate a transaction with an entity associated with a recipient account. Smart contract node 111 may receive, from enterprise organization node 120, data that identifies the entity associated with the recipient account and contact information associated with entity. Smart contract node 111 may generate a smart contract profile associated with the entity. Smart contract node 111 may populate the smart contract profile with the data that identifies the entity associated with the recipient account and the contact information associated with entity (e.g., the address of the entity, the phone number associated with the entity, and the like).

To further populate the smart contract profile associated with the entity, smart contract node 111 may access enterprise organization reference database 115 to retrieve enterprise-specific records, stored by the enterprise organization, that are associated with the entity (e.g., a listing of account numbers associated with the entity, financial records associated with the entity, a listing of successful transactions associated with the entity, a listing of failed transactions associated with the entity, and the like).

Smart contract node 111 may populate the smart contract profile associated with the entity using data indicating whether an online networking relationship exists between the consumer and the entity (e.g., online platforms which facilitate communication between the consumer and the entity, the frequency of online communications between the consumer and the entity, and the like). Smart contract node 111 may use data aggregators to collect the data indicating the online networking relationship between the consumer and the entity.

Smart contract node 111 may transmit the smart contract profile associated with the entity to trust score node 112 and may instruct trust score node 112 to generate a trust score associated with the entity based on the information in the smart contract profile. Smart contract node 111 may receive, from trust score node 112, a trust score associated with the entity. Smart contract node 111 may add the smart contract profile and the trust score to the blockchain. Smart contract node 111 may transmit the smart contract profile and the trust score to the smart contract profile database 116. Smart contract module 111 may transmit the smart contract profile to external account processing node 113. Smart contract module 111 may transmit the smart contract profile and the trust score to external account verification node 114.

Trust score node 112 may receive, from smart contract node 111, the smart contract profile associated with the entity. Trust score node 112 may use the smart contract profile to generate the trust score associated with the entity. Trust score node 112 may transmit the trust score to smart contract node 111.

External account processing node 113 may receive, from smart contract node 111, the smart contract profile associated with the entity. External account processing node 113 may use the contact information associated with the entity to identify external accounts associated with the entity. An account may be external if the account is associated with an enterprise organization other than the enterprise organization that received the consumer-initiated request from consumer node 130. External account processing node 113 may use data aggregators to locate and identify the external accounts associated with the entity. External account processing node 113 may transmit the external account data to external accounts database 117.

External account verification node 114 may receive, from smart contract node 111, the smart contract profile and the trust score. External account verification node 114 may retrieve, from external accounts database 117, the external account data associated with the entity. External account verification node 114 may receive, from enterprise organization node 120, enterprise-specific guidelines for determining a confidence threshold value (e.g., the entity should not be associated with accounts that are not in good standing, the external accounts should reflect a sufficient balance to execute the consumer-initiated request, the external accounts should have been open and active for at least a predetermined amount of time before engaging in transactions, or the like). External account verification node 114 may use the external account data and the enterprise-specific guidelines to determine the confidence threshold value. External account verification node 114 may compare the trust score to the confidence threshold value. If the trust score meets or exceeds the confidence threshold value, external account verification node 114 may transmit, to enterprise organization node 120, a notification indicating a successful verification of the entity associated with the recipient account. If the trust score fails to meet the confidence threshold, external account verification node 114 may transmit, to enterprise organization node 120 and consumer node 130, a notification indicating a failed verification of the entity associated with the recipient account. The notification indicating the failed verification may also indicate that external account verification node 114 will continuously compare an updated trust score to an updated confidence threshold value to determine whether the updated trust score satisfied the updated confidence threshold value.

Enterprise organization reference database 115 may store enterprise-specific records that are associated with the entity (e.g., a listing of account numbers associated with the entity, financial records associated with the entity, a listing of successful transactions associated with the entity, a listing of failed transactions associated with the entity, or the like). An enterprise organization may enter enterprise-specific records into enterprise organization reference database 115 using enterprise organization node 120. Access to enterprise organization reference database 115 may differ depending on the node that is requesting access (e.g., a hierarchy of accessibility). Enterprise organization node 120 may be associated with a first level of accessibility (e.g., the least restrictive level of accessibility). Enterprise organization 120 may perform functions on the enterprise-specific records stored within enterprise organization reference database 115 (e.g., access the enterprise-specific records, add enterprise-specific records, remove enterprise-specific records, modify the enterprise-specific records, or the like). Smart contract node 111 may be associated with a second level of accessibility (e.g., the most restrictive level of accessibility). Smart contract node 111 may access the enterprise-specific records that are associated with the entity, but might not be permitted to add, remove, or modify the enterprise-specific records stored within enterprise organization reference database 115.

Smart contract profile database 116 may store the smart contract profile associated with the entity and the trust score associated with the entity. Smart contract node 111 may transmit the smart contract profile and the trust score to smart contract profile database 116. Access to smart contract profile database 116 may differ depending on the node that is requesting access (e.g., a hierarchy of accessibility). Smart contract node 111 may be associated with a first level of accessibility (e.g., a least restrictive level of accessibility). Smart contract node 111 may perform functions on the smart contract profiles stored within smart contract profile database 116 (e.g., access existing smart contract profiles, update existing smart contract profiles, add additional smart contract profiles, remove smart contract profiles, and the like). External account processing node 113 and external account verification node 114 may be associated with a second level of accessibility (e.g., a most restrictive level of accessibility). External account processing node 113 and external account verification node 114 may access existing smart contract profiles, but might not be permitted to add, update, or remove smart contract profiles stored within smart contract profile database 116. Although two levels of accessibility are described, any number of levels of accessibility may be used without departing from the invention.

External accounts database 117 may store data indicating accounts that are associated with the entity and with an enterprise organization other than the enterprise organization which received the consumer request to initiate a transaction with the entity. External account processing node 113 may transmit the external accounts associated with the entity to external accounts database 117. Access to external accounts database 117 may differ depending on the node that is requesting access (e.g., a hierarchy of accessibility). External account processing node 113 may be associated with a first level of accessibility (e.g., the least restrictive level of accessibility). External account processing node 113 may perform functions on the data stored within external accounts database 117 (e.g., access the external accounts associated with the entity, update the existing external accounts associated with the entity, add external accounts associated with the entity, remove external accounts associated with the entity, and the like). External account verification node 114 may be associated with a second level of accessibility (e.g., the most restrictive level of accessibility). External account verification node 114 may access the existing external accounts associated with the entity, but might not be permitted to add, update, or remove external accounts associated with the entity stored within external accounts database 117.

FIG. 2 depicts an illustrative example of decentralized P2P computer system 200 that may be used for verifying external accounts in real-time, or near real-time, using dynamic smart contracts. Decentralized P2P computer system 200 may include a plurality of full node computing devices 210A, 210B, 210C, 210D, 210E, and 210F and lightweight node computing devices 250A and 250B, which may be respectively similar to full node computing device 210 described in FIG. 3A and lightweight node computing device 250 described in FIG. 3B. While a particular number of full node computing devices and lightweight node computing devices are depicted in FIG. 2, it should be understood that a number of full node computing devices and/or lightweight node computing devices greater or less than that of the depicted full node computing devices and lightweight node computing devices may be included in decentralized P2P computer system 200. Accordingly, any additional full node computing devices and/or lightweight node computing devices may respectively perform in the manner described below in regard to full node computing devices 210A-210F and lightweight node computing devices 250A and 250B in decentralized P2P computer system 200.

Each of full node computing devices 210A-210F may operate in concert to create and maintain decentralized P2P network 270 of decentralized P2P computer system 200. In creating decentralized P2P network 270 of decentralized P2P computer system 200, processors, ASIC devices, and/or graphics processing units (e.g., GPUs) of each full node computing device 210A-210F may execute network protocols which may cause each full node computing device 210A-210F to form a communicative arrangement with the other full node computing devices 210A-210F in decentralized P2P computer system 200. Furthermore, the execution of network protocols by the processors, ASIC devices, and/or graphics processing units (e.g., GPUs) of full node computing devices 210A-210F may cause full node computing devices 210A-210F to execute network functions related to blockchain 226 and thereby maintain decentralized P2P network 270. Enterprise organization node 120 may be one of full node computing devices 210A-210F as enterprise organization node 120 may cause functions to be executed within decentralized P2P computer system 200.

Lightweight node computing devices 250A and 250B may request execution of network functions related to blockchain 226 in decentralized P2P network 270. In order to request execution of network functions, such as a consumer-initiated transaction request and/or smart contract operations, processors of lightweight node computing devices 250A and 250B may execute network commands to broadcast the network functions to decentralized P2P network 270 comprising full node computing devices 210A-210F. Consumer node 130 may be one of lightweight node computing devices 250A or 250B as consumer node 130 may submit function requests to decentralized P2P network 270.

In some arrangements, a plurality of network function requests may be broadcasted across decentralized P2P network 270. Processors, ASIC devices, and/or GPUs of full node computing devices 210A-210F may execute network protocols to receive broadcast of each of the network functions through decentralized P2P network 270 and from the requesting entities, including lightweight node computing devices 250A and 250B.

Figures 3A, 3B:
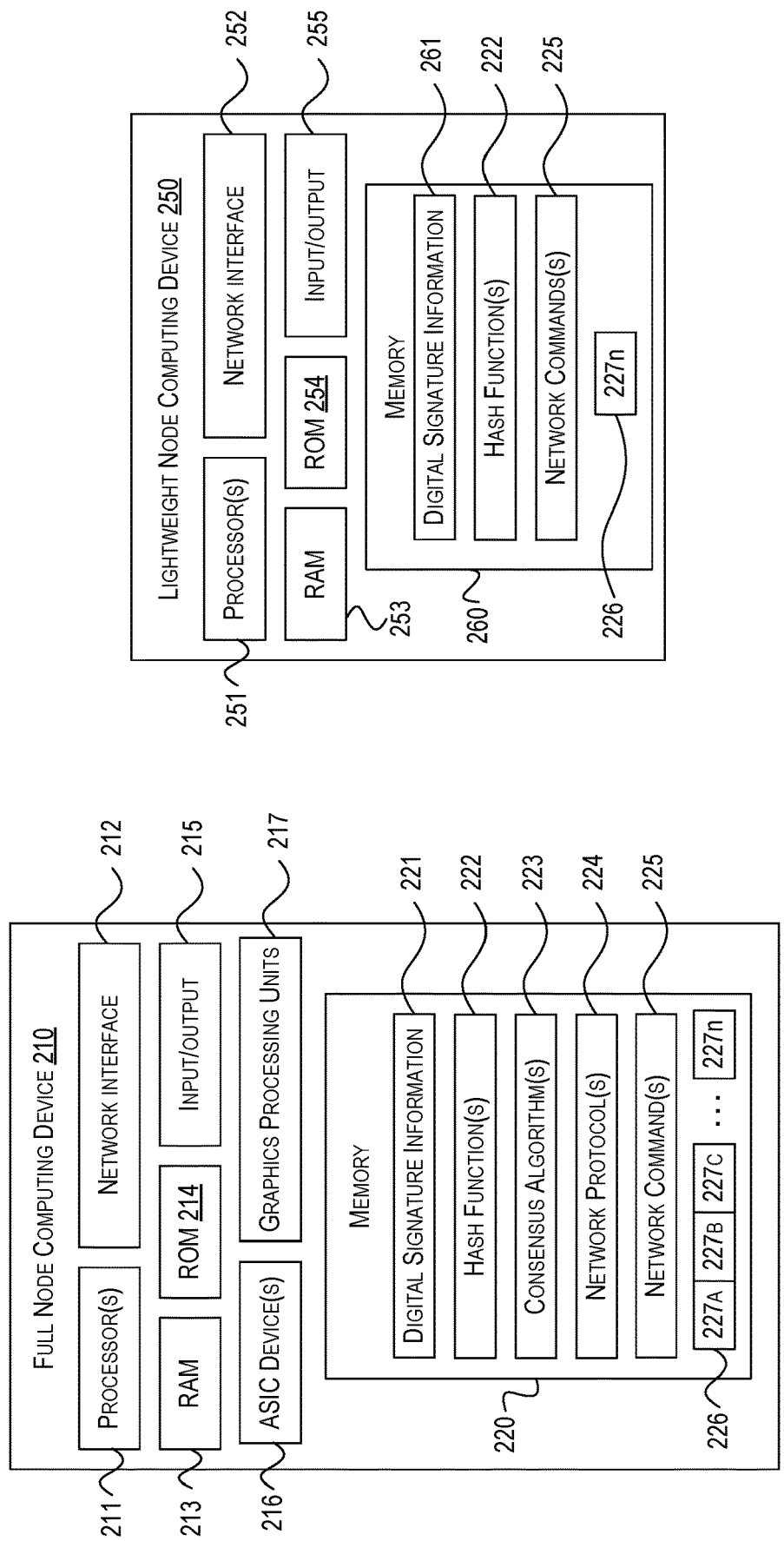
FIG. 3A depicts an illustrative example of a full node computing device that may be used for verifying external accounts in real-time using dynamic smart contracts in accordance with one or more example embodiments.
FIG. 3B depicts an illustrative example of a lightweight node computing device that may be used for verifying external accounts in real-time using dynamic smart contracts in accordance with one or more example embodiments.

FIG. 3A depicts an illustrative example of a full node computing device 210 that may be used for verifying external accounts in real-time, or near real-time, using dynamic smart contracts. Full node computing device 210 may be any of a personal computer, server computer, handheld or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, full node computing device 210 may be configured to operate in a decentralized P2P network and to request execution of network functions, and/or to execute requested network functions and to maintain inter-nodal agreement as to the state of a blockchain of the decentralized P2P network.

Full node computing device 210 may include one or more processors 211, which control overall operation, at least in part, of full node computing device 210. Full node computing device 210 may further include random access memory (RAM) 213, read only memory (ROM) 214, network interface 212, input/output interfaces 215 (e.g., keyboard, mouse, display, printer), and memory 220. Input/output (I/O) 215 may include a variety of interface units and drives for reading, writing, displaying, and/or printing data or files. In some arrangements, full node computing device 210 may further comprise specialized hardware components such as application-specific integrated circuit (e.g., ASIC) devices 216 and/or graphics processing units (e.g., GPUs) 217. Such specialized hardware components may be used by full node computing device 210 in performing one or more of the processes involved in the execution of requested network functions and maintenance of inter-nodal agreement as to the state of a blockchain. Full node computing device 210 may further store in memory 220 operating system software for controlling overall operation of the full node computing device 210, control logic for instructing full node computing device 210 to perform aspects described herein, and other application software providing secondary support, and/or other functionality which may or might not be used in conjunction with aspects described herein.

Memory 220 may also store data and/or computer executable instructions used in performance of one or more aspects described herein. For example, memory 220 may store digital signature information 221 and one or more hash functions 222, consensus algorithms 223, network protocols 224, and network commands 225. In some arrangements, digital signature information 221, hash functions 222, and/or network commands 225 may comprise a wallet of full node computing device 210. Memory 220 may further store blockchain 226. Each of digital signature information 221, hash functions 222, consensus algorithms 223, network protocols 224, and network commands 225 may be used and/or executed by one or more processors 211, ASIC devices 216, and/or GPUs 217 of full node computing device 210 to create and maintain a decentralized P2P network, request execution of network functions, and/or execute requested network functions and maintain inter-nodal agreement as to the state of blockchain 226.

In order to request execution of network functions, such as a consumer-initiated transaction request and/or smart contract operations, processors 211, ASIC devices 216, and/or GPUs 217 of full node computing device 210 may execute network commands 225 to broadcast the network function to a decentralized P2P network comprising a plurality of full nodes and/or lightweight nodes. The request may be digitally signed by full node computing device 210 with usage of the private/public key information and through execution of the digital signature algorithms of digital signature information 221. In order to execute requested network functions and maintain inter-nodal agreement as to the state of a blockchain, processors 211, ASIC devices 216, and/or GPUs 217 of full node computing device 210 may execute network protocols 224 to receive a broadcast of a requested network function through a decentralized P2P network and from a requesting entity such as a full node or lightweight node.

Memory 220 of full node computing device 210 may store blockchain 226. Blockchain 226 may include blocks 227A, 227B, 227C, . . . 227n, wherein block 227A represents the first block (e.g., genesis block) of blockchain 226 and block 227n represents the most immediate block of blockchain 226. As such, the blockchain 226, which may be a replica or copy of the blockchain of the decentralized P2P network in which full node computing device 210 operates, may be a full or complete copy of the blockchain of the decentralized P2P network. Each of the blocks within blockchain 226 may include information corresponding to the one or more network functions executed by the decentralized P2P network. As such, blockchain 226 as stored in memory 220 of full node computing device 210 may comprise the totality of network functions executed by the decentralized network.

FIG. 3B depicts an illustrative example of a lightweight node computing device 250 that may be used for verifying external accounts in real-time, or near real-time, using dynamic smart contracts. Lightweight node computing device 250 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, or the like, and may operate in a decentralized P2P network. In some embodiments, lightweight node computing device 250 may operate in a decentralized P2P network and may be configured to request execution of network functions through the decentralized P2P network. As such, lightweight node computing device 250 may be different from full node computing device 210 in that it might not be configured to execute network functions and/or to maintain a blockchain of a decentralized P2P network. In other aspects, lightweight node computing device 250 may have substantially the same physical configuration as full node computing device 210, but may be configured with different programs and/or software.

Lightweight node computing device 250 may include one or more processors 251, which control overall operation of lightweight node computing device 250. Lightweight node computing device 250 may further include random access memory (RAM) 253, read only memory (ROM) 254, network interface 252, input/output interfaces 255 (e.g., keyboard, mouse, display, printer), and memory 260. Input/output (I/O) 255 may include a variety of interface units and drives for reading, writing, displaying, and/or printing data or files. Lightweight node computing device 250 may store in memory 260 operating system software for controlling overall operation of the lightweight node computing device 250, control logic for instructing lightweight node computing device 250 to perform aspects described herein, and other application software providing secondary support and/or other functionality, which may or might not be used in conjunction with aspects described herein.

In comparison to full node computing device 210, lightweight node computing device 250 might not include, in some instances, specialized hardware such as ASIC devices 216 and/or GPUs 217. This may be because lightweight node computing device 250 might not be configured to execute network functions and/or to maintain a blockchain of a decentralized P2P network as is full node computing device 210.

Memory 260 of lightweight node computing device 250 may store data and/or computer executable instructions used in performance of one or more aspects described herein. For example, memory 260 may store digital signature information 261 and one or more hash functions 222 and network commands 225. In some arrangements, digital signature information 261, hash functions 222, and/or network commands 225 may comprise a wallet of lightweight node computing device 250. Each of hash functions 222 and network commands 225 stored in memory 260 of lightweight node computing device 250 may be respectively similar and/or identical to hash functions 222 network commands 225 stored in memory 220 of full node computing device 210. Each of digital signature information 261 stored in memory 260 of lightweight node computing device 250 and digital signature information 221 stored in memory 220 of full node computing device 210 may comprise similar and/or identical digital signature algorithms. However, the private/public key information of digital signature information 261 stored in memory 260 of lightweight node computing device 250 may be different from that of the private/public key information of digital signature information 221 stored in memory 220 of full node computing device 210. The private/public key information of each node, whether full or lightweight, in a decentralized P2P computing network may be unique to that particular node.

Each of digital signature information 261, hash functions 222, and network commands 225 may be used and/or executed by one or more processors 251 of lightweight node computing device 250 to request execution of network functions in a decentralized P2P network. For example, in order to request execution of network functions, such as a consumer-initiated transaction request and/or smart contract operations, processors 251 of lightweight node computing device 250 may execute network commands 225 to broadcast the network function to a decentralized P2P network comprising a plurality of full nodes and/or lightweight nodes. The request may be digitally signed by lightweight node computing device 250 with usage of the private/public key information and through execution of the digital signature algorithms of digital signature information 261.

Memory 260 of lightweight node computing device 250 may store blockchain 226. Blockchain 226 stored in memory 260 of lightweight node computing device 250 may include at least block 227n, wherein block 227n represents the most immediate block of blockchain 226. As such, blockchain 226, which may be a replica or copy of the blockchain of the decentralized P2P network in which lightweight node computing device 250 operates, may be a partial or incomplete copy of the blockchain of the decentralized P2P network. In some instances, however, blockchain 226 may include blocks 227A, 227B, 227C, ... 227*n*, wherein block 227A represents the first block (e.g., genesis block) of blockchain 226 and block 227*n* represents the most immediate block of blockchain 226. As such, the blockchain 226 may be a full or complete copy of the blockchain of the decentralized P2P network. Each of the blocks within blockchain 226 may include information corresponding to the one or more network functions executed by the decentralized P2P network.

Verifying External Accounts in Real Time Using Dynamic Smart Contracts

Figure 4A:
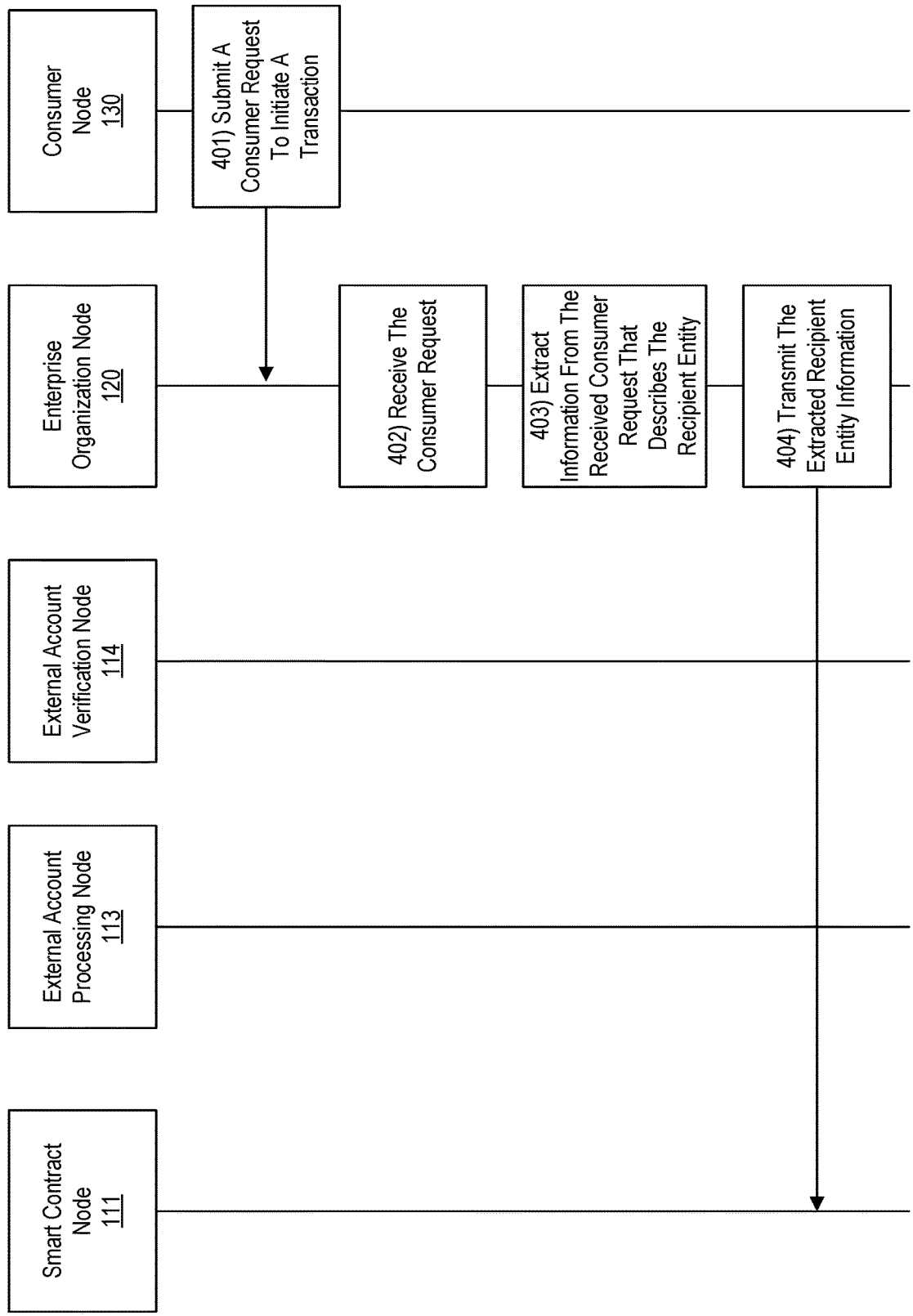
FIGS. 4A-4E depict an illustrative event sequence for verifying external accounts in real-time using dynamic smart contracts in accordance with one or more example embodiments.

FIGS. 4A-4E depict an illustrative event sequence for verifying external accounts in real-time using dynamic smart contracts. One or more aspects described herein may be performed in real-time or near real-time. Referring to FIG. 4A, at step 401, consumer node 130 may submit, to enterprise organization node 120, a request to initiate a transaction with an entity wherein an enterprise organization may process the transaction. In some examples, consumer node 130 may be associated with a lightweight node computing device (e.g., lightweight node computing device 250 as described in connection with FIG. 3B). However, consumer node 130 may be associated with a full node computing device (e.g., full node computing device 210 as described in connection with FIG. 3A), without departing from the description provided herein. In some examples, enterprise organization node 120 may be associated with a full node computing device (e.g., full node computing device 210 as described in connection with FIG. 3A). However, enterprise organization node 120 may be associated with a lightweight node computing device (e.g., lightweight node computing device 250 as described in connection with FIG. 3B), without departing from the description provided herein.

Consumer node 130 may transmit the request to enterprise organization node 120 via a network connection established between consumer node 130 and enterprise organization node 120. The connection between consumer node 130 and enterprise organization node 120 may be established across network 140. The consumer associated with consumer node 130 may use a computing device to navigate to a webpage or web application that is associated with the enterprise organization. Using the webpage or web application that is associated with the enterprise organization, a consumer may, using consumer node 130, locate the consumer portal for transaction request submissions.

Consumer node 130 may be associated with an institution (e.g., a financial institution that processes loan applications). To process the loan application, personnel within the financial institution may need to access and analyze the accounts associated with the individual or organization that submitted the loan application. Using consumer node 130, the personnel associated with the financial institution may navigate to the webpage associated with the enterprise organization that will facilitate the loan process. Using consumer node 130, the personnel associated with the financial institution may submit, to the enterprise organization, a request to access the accounts associated with the entity.

Alternatively, consumer node 130 may be associated with an individual looking to process a transaction (e.g., the owner of a small business who is interested in transferring funds to a business associate). To do so, the owner of the small business may, using consumer node 130, navigate to a web application associated with the enterprise organization. Using consumer node 130, the owner of the small business may locate the consumer request submission portal, and may submit a request to the enterprise organization to transfer funds.

At step 402, enterprise organization node 120 may receive the consumer-initiated request. Enterprise organization node 120 may receive the consumer-initiated request via a connection established between enterprise organization node 120 and consumer node 130 across network 140.

At step 403, enterprise organization node 120 may extract information from the consumer-initiated request. Enterprise organization node 120 may identify and extract information that identifies and describes the consumer associated with the consumer-initiated request as well as information that identifies and describes the entity associated with the recipient account. If the consumer is an individual, enterprise organization node 120 may extract the personal identifiable information associated with the consumer (e.g., the consumer's name, the consumer's address, the consumer's account number, the consumer's unique identification number, the consumer's phone number, and the like). If the consumer is an organization or institution (e.g., a financial institution), enterprise organization node 120 may extract information that identifies the organization or institution (e.g., the institution's name, the institution's address, the institution's branch code or other location identifier, the organization's identification number, the organization's account number, and the like).

Enterprise organization node 120 may also extract information that identifies and describes the entity associated with the recipient account. If the entity is an individual, enterprise organization node 120 may extract the personal identifiable information associated with the entity (e.g., the entity's name, the entity's address, the entity's account number, the entity's unique identification number, the entity's phone number, and the like). If the entity is an organization or institution (e.g., a financial institution), enterprise organization node 120 may extract information that identifies the organization or institution (e.g., the institution's name, the institution's address, the institution's branch code or other location identifier, the organization's identification number, the organization's account number, and the like).

Enterprise organization node 120 may also extract information that is associated with one or more parameters of the transaction (e.g., the amount of funds to be transferred from the consumer to the entity associated with the recipient account, the assets to be reassigned from the consumer to the entity associated with the recipient account, the accounts that a consumer needs to review prior to granting or denying a loan request, and the like). From this, enterprise organization node 120 may identify the assets, amount of funds, or accounts associated with the consumer-initiated request.

Enterprise organization node 120 may also extract additional information that the consumer included in the transaction request (e.g., a deadline by which the transaction should be completed, an indication that the consumer is also interested in receiving information about a particular loan repayment process, an indication that the consumer may need to transfer funds from a first consumer account to a second consumer account prior to executing the transaction with the entity associated with the recipient account, and the like).

FIG. 6 depicts a sample consumer request wherein the consumer is an individual and the entity associated with the recipient account is an individual. As illustrated in FIG. 6, enterprise organization node 120 may extract information that identifies the consumer, including the consumer's name (e.g., Last Name 1, First Name 1), the consumer's address (e.g., Street Name 1, City, State, Zip Code), and the consumer's account number (e.g., AAAAAAA). Enterprise organization node 120 may extract the details of the consumer-initiated request (e.g., transfer $2,000 to account number BBBBBBB). Enterprise organization node 120 may extract information that identifies the entity associated with the recipient account, including the entity's name (e.g., Last Name 2, First Name 2), the entity's address (e.g., Street Name 2, City, State, Zip Code), and the entity's account number (e.g., BBBBBBB).

FIG. 7 depicts a sample consumer request wherein the consumer is an individual and the entity associated with the recipient account is an organization. As illustrated in FIG. 7, enterprise organization node 120 may extract information that identifies the consumer, including the consumer's name (e.g., Last Name 1, First Name 1), the consumer's address (e.g., Street Name 1, City, State, Zip Code), and the consumer's account number (e.g., AAAAAAA). Enterprise organization node 120 may extract the details of the consumer-initiated request (e.g., transfer $1,000 to account number CCCCCCC). Enterprise organization node 120 may extract information that identifies the entity associated with the recipient account, including the entity's name (e.g., Entity 1), the entity's address (e.g., Street Name 3, City, State, Zip Code), the entity's account number (e.g., CCCCCCC), and the entity's branch code or other location identifier (e.g., DDD).

FIG. 8 depicts a sample consumer request wherein the consumer is an organization and the entity associated with the recipient account is an individual. As illustrated in FIG. 8, enterprise organization node 120 may extract information that identifies the consumer, including the consumer's name (e.g., Entity 2), the consumer's address (e.g., Street Name 4, City, State, Zip Code), the consumer's account number (e.g., EEEEEEE), and the consumer's branch code or other location identifier (e.g., FFF). Enterprise organization node 120 may extract the details of the consumer-initiated request (e.g., access to account number BBBBBBB—an analysis of account activity and standing is required prior to processing a loan application filed by the recipient entity). Enterprise organization node 120 may extract information that identifies the entity associated with the recipient account, including the entity's name (e.g., Last Name 2, First Name 2), the entity's address (e.g., Street Name 2, City, State, Zip Code), and the entity's account number (e.g., BBBBBBB).

FIG. 9 depicts a sample consumer request wherein the consumer is an organization and the entity associated with the recipient account is an organization. As illustrated in FIG. 9, enterprise organization node 120 may extract information that identifies the consumer, including the consumer's name (e.g., Entity 2), the consumer's address (e.g., Street Name 4, City, State, Zip Code), the consumer's account number (e.g., EEEEEEE), and the consumer's branch code or other location identifier (e.g., FFF). Enterprise organization node 120 may extract the details of the consumer-initiated request (e.g., access to account number CCCCCCC—an analysis of account activity and standing is required prior to processing a loan application filed by the recipient entity). Enterprise organization node 120 may extract information that identifies the entity associated with the recipient account, including the entity's name (e.g., Entity 1), the entity's address (e.g., Street Name 3, City, State, Zip Code), the entity's account number (e.g., CCCCCCC), and the entity's branch code or other location identifier (e.g., DDD).

At step 404, enterprise organization node 120 may transmit, to smart contract node 111, the information extracted from the consumer-initiated request (e.g., the information presented in FIGS. 6-9). Enterprise organization node 120 may transmit the extracted information to smart contract node 111 via a connection established between enterprise organization node 120 and smart contract node 111. The connection between enterprise organization node 120 and smart contract node 111 may be established across network 140.

Figure 4B:
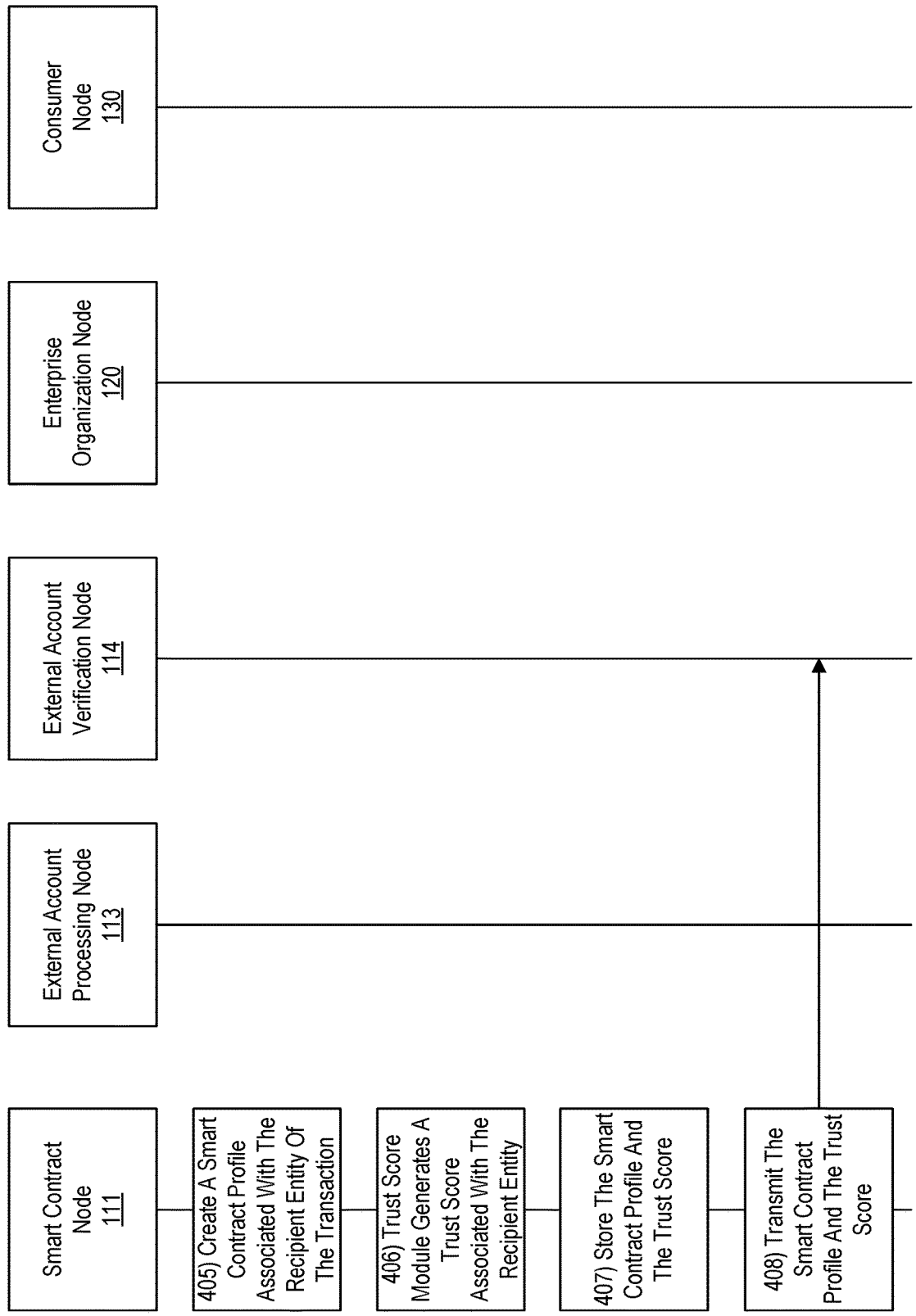

Referring to FIG. 4B, at step 405, smart contract node 111 may generate a smart contract profile that describes an entity that is associated with the recipient account of the consumer-initiated transaction. In some examples, smart contract node 111 may be associated with a lightweight node computing device (e.g., lightweight node computing device 250 as described in connection with FIG. 3B). However, smart contract node 111 may be associated with a full node computing device (e.g., full node computing device 210 as described in connection with FIG. 3A), without departing from the description provided herein.

The recipient account may be used to facilitate the consumer-initiated transaction between the consumer and the entity that is associated with the recipient account (e.g., transfer funds to or from the recipient account, deduct loan payments from the recipient account after the consumer approves the entity's loan request, and the like). As illustrated in FIGS. 6-9, the entity may be an individual (e.g., the owner of a small business), or an organization or institution (e.g., a financial institution, a non-profit organization that provides for the general public, a loan processing organization, and the like).

To generate a smart contract profile that describes the entity, smart contract node 111 may gather data associated with the entity (e.g., contact information associated with the entity, personal identifiable information associated with the entity, information that describes whether a web-based relationship exists between the consumer and the entity, external accounts associated with the entity, and the like). To populate the smart contract profile, smart contract node 111 may access a contact list associated with consumer node 130. The contact list associated with consumer node 130 may contain information indicating the way in which consumer node 130 communicates with the entity. For example, if a consumer associated with consumer node 130 engages in phone conversations with the entity, then the contact list may indicate a phone number associated with the entity. If a consumer associated with consumer node 130 sends emails to, and receives emails from, the entity, then the contact list may indicate an email address associated with the entity. If a consumer associated with consumer node 130 sends mail to, and receives mail from, the entity, then the contact list may indicate a physical address associated with the entity. Smart contract node 111 may extract the information within the consumer's contact list that identifies a method of communication between the consumer and the entity, and may extract the contact information associated with the entity. Smart contract node 111 may add the extracted contact information to the smart contract profile associated with the entity. Smart contract node 111 may monitor the contact list associated with consumer node 130 and may identify changes to the contact list. Smart contract node 111 may update the smart contract profile associated with the entity as the data within the contact list changes.

FIG. 10 depicts a sample smart contract profile associated with an entity, wherein the entity is an individual. As illustrated in FIG. 10, the contact list associated with consumer node 130 indicates that the consumer and the entity communicate via the telephone and e-mail. Smart contract node 111 may extract the telephone number that the consumer uses to communicate with the entity (e.g., (XXX) XXX-XXXX). Smart contract node 111 may extract the e-mail address that the consumer uses to communicate with the entity (e.g., first.last@entity.net).

Smart contract node 111 may request access to the enterprise organization reference database 115. Enterprise organization reference database 115 may store enterprise-specific records that are associated with the entity (e.g., a listing of account numbers associated with the entity, financial records associated with the entity, a listing of successful transactions associated with the entity, a listing of failed transactions associated with the entity, and the like). As described in connection with FIG. 1B, smart contract node 111 may access the enterprise-specific records that are associated with the entity, but might not be permitted to add or remove the enterprise-specific records stored within enterprise organization reference database 115. Smart contract node 111 may retrieve, from enterprise organization reference database 115, the enterprise-specific records that are associated with the entity, and may add the enterprise-specific records to the smart contract profile associated with the entity. Smart contract node 111 may monitor enterprise organization reference database 115 and may identify changes to enterprise organization reference database 115. Smart contract node 111 may update the smart contract profile associated with the entity as the enterprise-specific records within enterprise organization reference database 115 change.

As illustrated in FIG. 10, an enterprise-specific record indicates the account numbers associated with the entity (e.g., account number AAAAAAA and account number CCCCCCC). Another enterprise-specific record indicates the number of failed transactions associated with the entity (e.g., 15 transactions, out of a total of 35 transactions, have failed). Another enterprise-specific record indicates the number of successful transactions associated with the entity (e.g., 20 transactions, out of a total of 35 transactions, were successfully executed).

Smart contract node 111 may employ data aggregators to explore the relationship between the consumer and the entity on a variety of web-based media (e.g., social media platforms, digital communication platforms, digital entertainment platforms, and the like). The data aggregators may determine whether the consumer and the entity interact on different digital platforms (e.g., share posts via social media platform 1, are friends on social media platform 2, send e-mails using communication platform 1 and communication platform 2, and the like). The data aggregators may determine the extent of the interaction between the consumer and the entity across a variety of digital platforms. If the consumer and the entity do not communicate via a digital platform, the data aggregators may determine that a web-based relationship does not exist between the consumer and the entity. Alternatively, if the consumer and the entity communicate on at least one digital platform, the data aggregators may determine the extent of the web-based relationship between the consumer and the entity.

To determine the extent of the web-based relationship between the consumer and the entity, the data aggregators may weigh the frequency of the communications against the number of digital platforms upon which the consumer and the entity engage. The data aggregators may receive, from smart contract node 111, criteria for determining the extent of the web-based relationship between the consumer and the entity (e.g., whether the consumer and the entity have interacted recently, whether the interactions between the consumer and the entity are active, whether the interactions between the consumer and the entity have ended, and the like).

The data aggregators may determine the number of platforms on which the consumer interacts with the entity associated with the recipient account. For each platform, the data aggregators may determine the frequency with which the consumer and the entity interact (e.g., send and receive daily emails, share weekly posts, share daily business updates, and the like). If the interaction between the consumer and the entity satisfies a predetermined number of predetermined criteria (e.g., whether the consumer and entity remain connected on a social media platform, whether the consumer and the entity have interacted in the past month, and the like), then the data aggregators may use the predetermined criteria to describe the extent of the web-based relationship between the consumer and the entity. For example, the data aggregators may determine that the consumer sent at least one email per day to the entity and received at least one email per day from the entity for the last three months. As such, the data aggregators may determine that a web-based relationship exists between the consumer and the entity, and may determine, based on the daily emails spanning three months, that the relationship is active and continuous.

Alternatively, if the interaction between the consumer and the entity fails to satisfy the predetermined number of the predetermined criteria, then the data aggregators may use the predetermined criteria to describe the extent of the web-based relationship between the consumer and the entity. For example, the data aggregators may determine that the consumer and the entity are not connected on social platforms and do not communicate through e-mail. As such, the data aggregators may determine that a web-based relationship does not exist between the consumer and the entity.

The data aggregators may transmit their determination to smart contract node 111 (e.g., whether or not a web-based relationship exists between the consumer and the entity, and, if a relationship exists, the extent of the relationship). The data aggregators may monitor the web-based relationship between the consumer and the entity, and may identify modifications to the web-based relationship. The data aggregators may report any changes to smart contract node 111. Smart contract node 111 may add the web-based relationship data to the smart contract profile associated with the entity. Smart contract node 111 may continuously update the data indicating the web-based relationship between the consumer and the entity based on new data from the data aggregators.

As illustrated in FIG. 10, the web-based relationship data indicates that there is a web-based relationship between the consumer and the entity (e.g., the consumer and the entity are connected on social media platform 1, are friends on social media platform 2, and the consumer and the entity send and receive daily emails through communication platform 1 and communication platform 2).

Smart contract node 111 may add enterprise-specific rules, determined by the enterprise organization, to the smart contract profile associated with the entity. Smart contract node 111 may receive the enterprise-specific rules from enterprise organization node 120. Enterprise organization node 120 may transmit the enterprise-specific rules to smart contract node 111 via a connection between enterprise organization node 120 and smart contract node 111. The connection between enterprise organization node 120 and smart contract node 111 may be established across network 140.

The enterprise-specific rules may indicate the criteria that trust score node 112 should consider when determining a trust score associated with the entity (e.g., whether the entity has an existing account with the enterprise organization, whether the entity's existing accounts are in good standing, and the like). The enterprise-specific rules may also include guidelines that trust score node 112 should follow when determining the trust score associated with the entity (e.g., if the entity has accounts that are not in good standing and accounts that are in good standing, then assign a greater weight to the accounts that are not in good standing). Smart contract node 111 may add the enterprise-specific rules to the smart contract profile associated with the entity. Smart contract node 111 may continuously monitor communication with enterprise organization node 120 to identify changes to the existing enterprise-specific rules. Smart contract node 111 may update the enterprise-specific rules as it receives modifications from enterprise organization node 120.

As illustrated in FIG. 10, the enterprise-specific rules indicate that trust score node 112 should assign a greater weight to the accounts that are not in good standing than to the accounts in good standing. The enterprise-specific rules indicate that trust score node 112 should not consider accounts that have been closed when determining the trust score associated with the entity. The enterprise-specific rules also indicate that the accounts that trust score node 112 analyzes to determine a trust score associated with the entity should be open and active for at least 48 hours prior to engaging in a transaction.

At step 406, trust score node 112 may determine a trust score associated with the entity. In some examples, trust score node 112 may be associated with a lightweight node computing device (e.g., lightweight node computing device 250 as described in connection with FIG. 3B). However, trust score node 112 may be associated with a full node computing device (e.g., full node computing device 210 as described in connection with FIG. 3A), without departing from the description provided herein.

To determine the trust score associated with the entity, trust score node 112 may receive, from smart contract node 111, the smart contract profile that was generated in step 405. Trust score node 112 may extract the data within the smart contract profile (e.g., extract each enterprise-specific record, extract each indication of a web-based relationship between the consumer and the entity, extract each indication of communication methods used by the consumer and the entity, extract the information indicating the frequency of communication between the consumer and the entity, and the like). Trust score node 112 may use the enterprise-specific rules in the smart contract profile to determine the weight that attaches to the extracted data (e.g., a weight that attaches to the enterprise-specific records that are stored in enterprise organization reference database 115, a weight that attaches to the data indicating a web-based relationship between the consumer and the entity, a weight that attaches to the frequency of communication between the consumer and the entity, and the like). Using the enterprise-specific rules, trust score node 112 may determine a weighted value associated with the extracted data and may combine the weighted values to determine the trust score associated with the entity. Trust score node 112 may continuously determine the trust score associated with the entity such that the trust score represents the most recent data associated with the entity. Trust score node 112 may transmit the trust score to smart contract node 111.

At step 407, smart contract node 111 may store both the smart contract profile associated with the entity and the trust score associated with the entity. Smart contract node 111 may store the smart contract profile and the trust score in smart contract profile database 116. Smart contract node 111 may transmit the smart contract profile and the trust score to smart contract profile database 116 via a connection established between smart contract node 111 and smart contract profile database 116. The connection between smart contract node 111 and smart contract profile database 116 may be established across network 140.

Smart contract node 111 may transmit, to smart contract profile database 116, an updated smart contract profile each time smart contract node 111 receives updated data related to the entity. Smart contract node 111 may continuously transmit, to smart contract profile database 116, an updated trust score. The smart contract profiles and trust scores that are stored in smart contract profile database 116 may represent the most recent data associated with the entity.

At step 408, smart contract node 111 may transmit, to external account verification node 114, the smart contract profile associated with the entity and the trust score associated with the entity. Smart contract node 111 may transmit the smart contract profile and the trust score to external account verification node 114 via a connection that is established between smart contract node 111 and external account verification node 114. The connection may be established across network 140. As discussed in steps 414 and 415, external account verification node 114 may use the smart contract profile and the trust score to determine whether the trust score satisfies a confidence threshold.

Figure 4C:
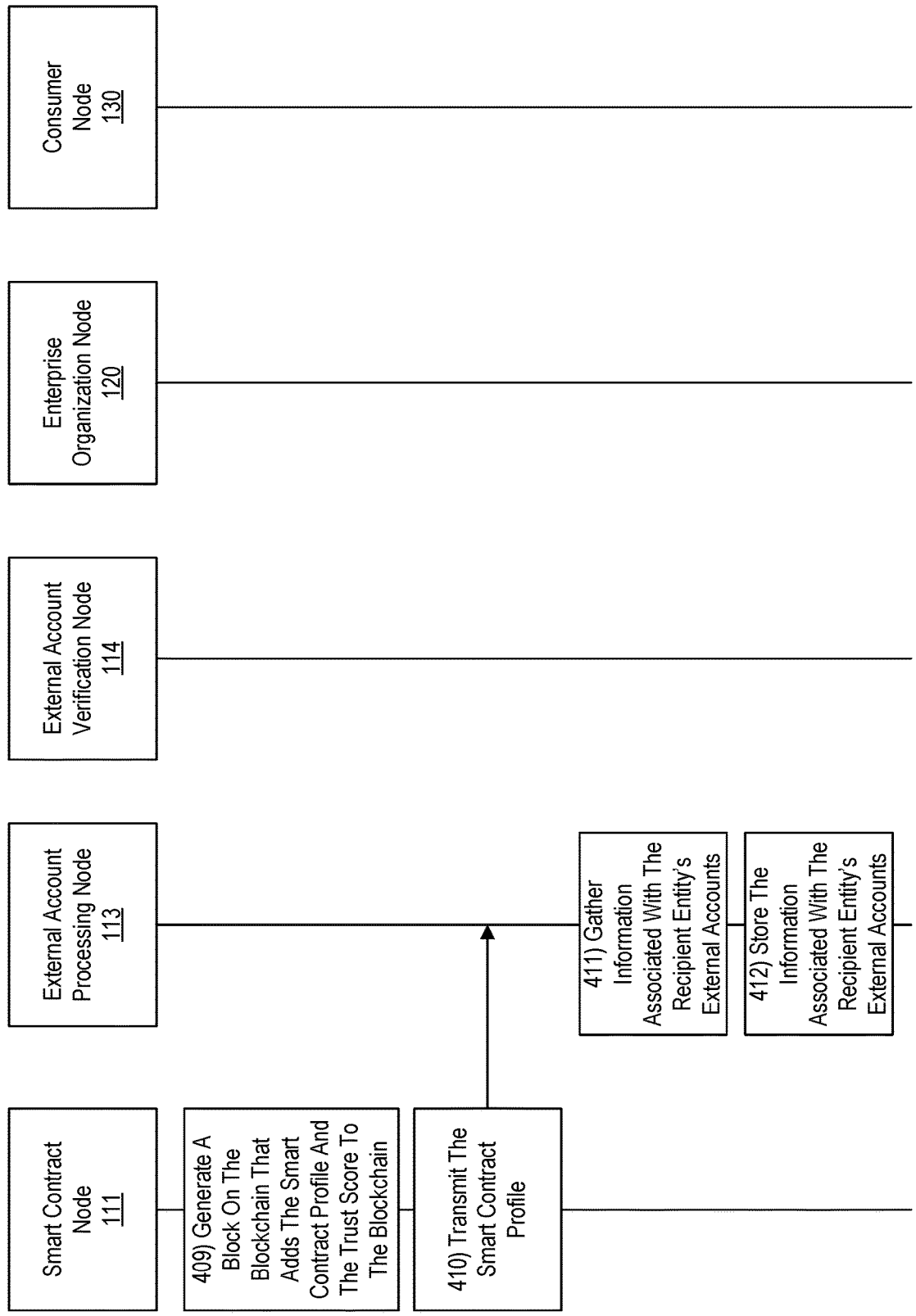

Referring to FIG. 4C, at step 409, smart contract node 111 may add the smart contract profile and the trust score associated with the entity to the blockchain. The blockchain (e.g., blockchain 226) may include a plurality of blocks (e.g., 227A, 227B, 227C, . . . 227n, wherein block 227A represents the first block of blockchain 226 and block 227n represents the most immediate block of blockchain 226). To add the smart contract profile and the trust score associated with the entity to the blockchain, smart contract node 111 may create a new block (e.g., block 227n of blockchain 226) and may add the new block to the blockchain as the most immediate block of the blockchain. Smart contract node 111 may add the smart contract profile and the trust score associated with the entity to the most immediate block of the blockchain.

Smart contract node 111 may continuously add an updated smart contract profile and an updated trust score to the blockchain as smart contract node 111 determines the updated smart contract profile and receives the updated trust score from trust score node 112. To add the updated smart contract profile and the updated trust score to the blockchain, smart contract node 111 may create a new block (e.g., block 227n of blockchain 226) and may add the new block to the blockchain as the most immediate block of the blockchain. Smart contract node 111 may add the updated smart contract profile and the updated trust score to the most immediate block of the blockchain (e.g., block 227n of blockchain 226). The most immediate block of the blockchain may contain the updated smart contract profile and the updated trust score as well as the data in the preceding blocks that is associated with the entity.

For example, block 227A of blockchain 226 may contain an initial smart contract profile and an initial trust score associated with the entity. Smart contract node 111 may determine that the enterprise-specific records associated with the entity have changed, and may update the smart contract profile associated with the entity to reflect the changes. Smart contract node 111 may transmit, to trust score 112, the updated smart contract profile. Trust score 112 may use the updated smart contract profile to determine an updated trust score and may transmit, to smart contract node 111, the updated trust score. Smart contract node 111 may create block 227B on blockchain 226 and may add the updated smart contract profile and the updated trust score to block 227B. Smart contract node 111 may also add the content of block 227A to block to 227B such that block 227B contains the most recent smart contract profile and trust score associated with the entity, as well as previous smart contract profiles and trust scores associated with the entity.

At step 410, smart contract node 111 may transmit, to external account processing node 113, the smart contract profile associated with the entity. Smart contract node 111 may transmit the smart contract profile to external account processing node 113 via a connection that is established between smart contract node 111 and external account processing node 113. The connection may be established across network 140. As discussed in step 411, external account processing node 113 may use the data within the smart contract profile to identify accounts that are associated with the entity, but exist outside of the enterprise organization that received the consumer-initiated request (e.g., external accounts).

At step 411, external account processing node 113 may use data aggregators to identify external accounts associated with the entity. In some examples, external account processing node 113 may be associated with a lightweight node computing device (e.g., lightweight node computing device 250 as described in connection with FIG. 3B). However, external account processing node 113 may be associated with a full node computing device (e.g., full node computing device 210 as described in connection with FIG. 3A), without departing from the description provided herein.

External account processing node 113 may extract, from the smart contract profile associated with the entity, information that identifies and describes the entity. If the entity is an individual, external account processing node 113 may extract the personal identifiable information associated with the entity (e.g., the entity's name, the entity's address, the entity's unique identification number, the entity's tax identification number, and the like). If the entity is an institution or an organization, external account processing node 113 may extract information that identifies the institution or the organization (e.g., the entity's name, the entity's address, the entity's tax identification number, the entity's unique identification number, the entity's organization identification number, and the like).

External account processing node 113 may transmit the extracted information to the data aggregators. External account processing node 113 may instruct the data aggregators to use the extracted information to locate and identify external accounts associated with the entity (e.g., accounts associated with the entity and various financial institutions). External account processing node 113 may further instruct the data aggregators to determine whether the extracted information was used to establish an external account associated with the entity (e.g., whether the entity's unique identification number was used to open an external account, whether the entity's organization identification number was used to open an external account, and the like). External account processing node 113 may instruct the data aggregators to collect information associated with the identified external accounts (e.g., the organization with which the account is associated, whether the account satisfies enterprise requirements, whether the account is in good standing, the account balance, and the like). External account processing node 113 may continuously monitor the smart contract profile associated with the entity to identify changes in the data within the smart contract profile (e.g., a change in the entity's name, discontinued use of the entity's organization identification number, an additional organization identification number associated with the entity, and the like). If there are modifications to the data within the smart contract profile, external account processing node 113 may update the data aggregators on the modifications to the smart contract profile. External account processing node 113 may instruct the data aggregators to use the most recent data to identify external accounts associated with the entity. The data aggregators may continuously monitor whether the entity is associated with external accounts. The data aggregators may continuously inform external account processing node 113 of the external accounts associated with the entity.

At step 412, external account processing node 113 may store the data indicating the external accounts associated with the entity. External account processing node 113 may transmit the data indicating the external accounts associated with the entity to external accounts database 117. External account processing node 113 may continuously transmit data indicating the external accounts associated with the entity as external account processing node 113 receives new data from the data aggregators. External account processing node 113 may transmit the data indicating external accounts to external accounts database 117 via a connection that is established between external account processing node 113 and external accounts database 117. The connection may be established across network 140. As discussed in steps 413 and 414, external account verification node 114 may use the data indicating external accounts to determine a confidence threshold.

Figure 4D:
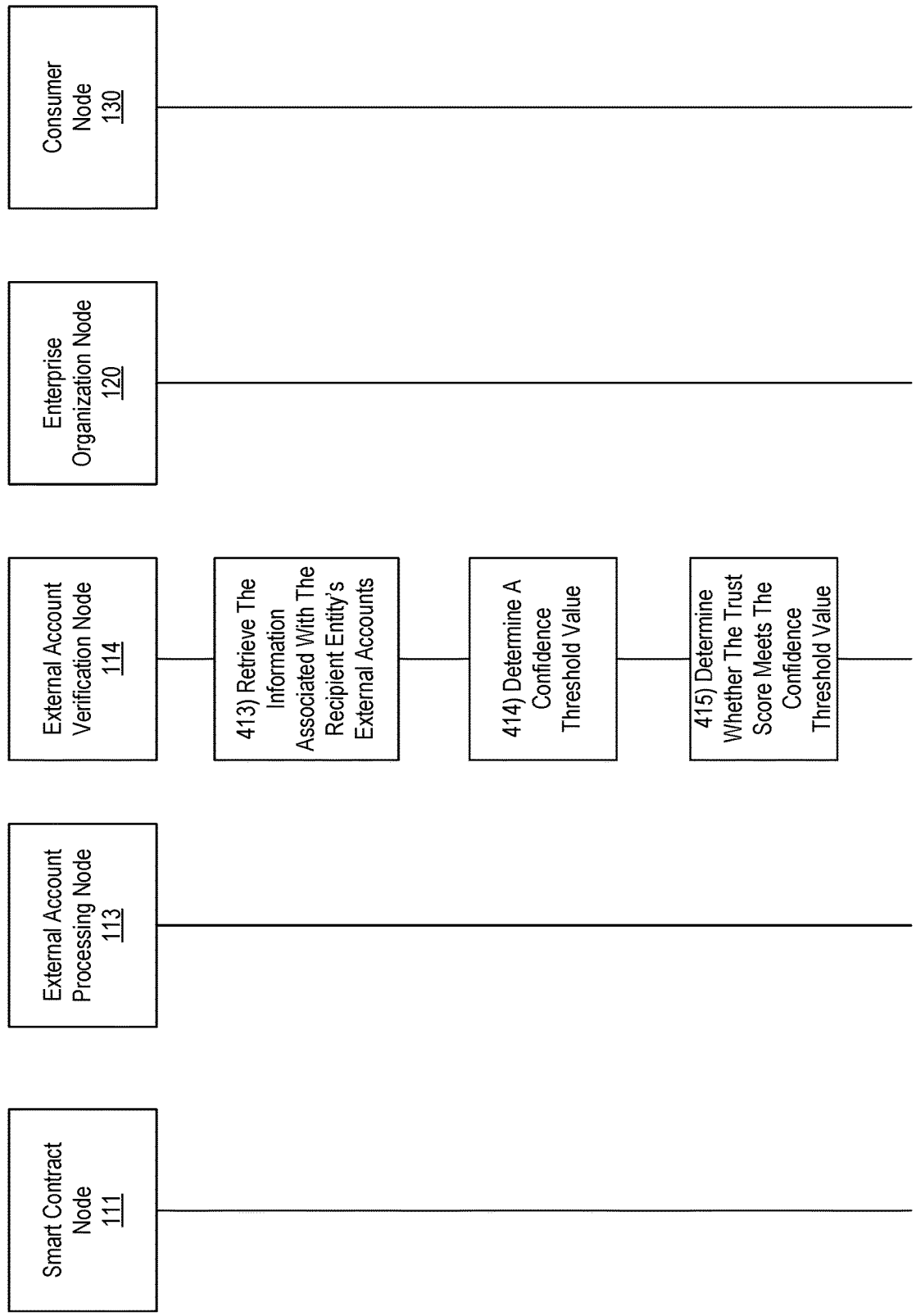

Referring to FIG. 4D, at step 413, external account verification node 114 may retrieve, from external accounts database 117, the data indicating the external accounts associated with the entity. As discussed in step 414, external account verification node 114 may use the data indicating the external accounts associated with the entity to determine a confidence threshold.

At step 414, external account verification node 114 may determine a confidence threshold value against which the trust score associated with the entity may be measured. In some examples, external account verification node 114 may be associated with a lightweight node computing device (e.g., lightweight node computing device 250 as described in connection with FIG. 3B). However, external account verification node 114 may be associated with a full node computing device (e.g., full node computing device 210 as described in connection with FIG. 3A), without departing from the description provided herein.

The confidence threshold value may indicate the minimum trust score that external account verification node 114 may use to determine the legitimacy of the recipient account associated with the entity and of the entity. To determine a confidence threshold value, external account verification node 114 may receive, from enterprise organization node 120, enterprise-specific guidelines for determining the confidence threshold value. The guidelines from enterprise organization node 120 may indicate characteristics that the external account should satisfy for the enterprise organization to approve the consumer-initiated request (e.g., the external accounts should be in good standing, the external accounts should reflect a sufficient balance to execute the consumer-initiated request, the external accounts should have been open and active for at least a predetermined time period (e.g., 24 hours, 48 hours, or the like) before engaging in transactions, and the like). The guidelines from enterprise organization node 120 may also indicate the range of values within which the confidence threshold value may fall (e.g., the confidence threshold value may range from 0 to 100).

External account verification node 114 may analyze the external accounts in accordance with the enterprise-specific guidelines. External account verification node 114 may determine whether each external account associated with the entity satisfies each enterprise-specific guideline. External verification node 114 may assign a weight to each external account which indicates whether the external account satisfies the enterprise-specific guidelines. If the external accounts satisfy at least a predetermined number of enterprise-specific guidelines, the entity may need to meet a first confidence threshold value (e.g., a low confidence threshold value). Alternatively, if the external accounts fail to satisfy at least the predetermined number of enterprise-specific guidelines, the entity may need to meet a second confidence threshold value (e.g., a confidence threshold value that is higher than the first confidence threshold value). External account verification node 114 may adjust the confidence threshold value depending on whether each external account satisfies the enterprise-specific guidelines.

At step 415, external account verification node 114 may determine whether the trust score associated with the entity meets the confidence threshold value determined in step 414. To do so, external account verification node 114 may compare the trust score to the confidence threshold value. The trust score may be a weighted representation of the enterprise-specific records that are stored in enterprise organization reference database 115, a weighted representation of the web-based relationship between the consumer and the entity, and a weighted representation of the frequency of communication between the consumer and the entity.

External account verification node 114 may determine whether the trust score meets or falls below the confidence threshold value. As discussed in steps 416a and 416b, external account verification node 114 may pursue one of two courses of action based on whether the trust score meets or falls below the confidence threshold value (e.g., transmit a notification indicating a successful verification of the entity or transmit a notification indicating a failed verification of the entity). Enterprise organization node 120 may also pursue one of two courses of action based on whether the trust score meets or falls below the confidence threshold value (e.g., approve the consumer request to initiate a transaction with the entity or deny the consumer request to initiate a transaction with the entity).

Figure 4E:
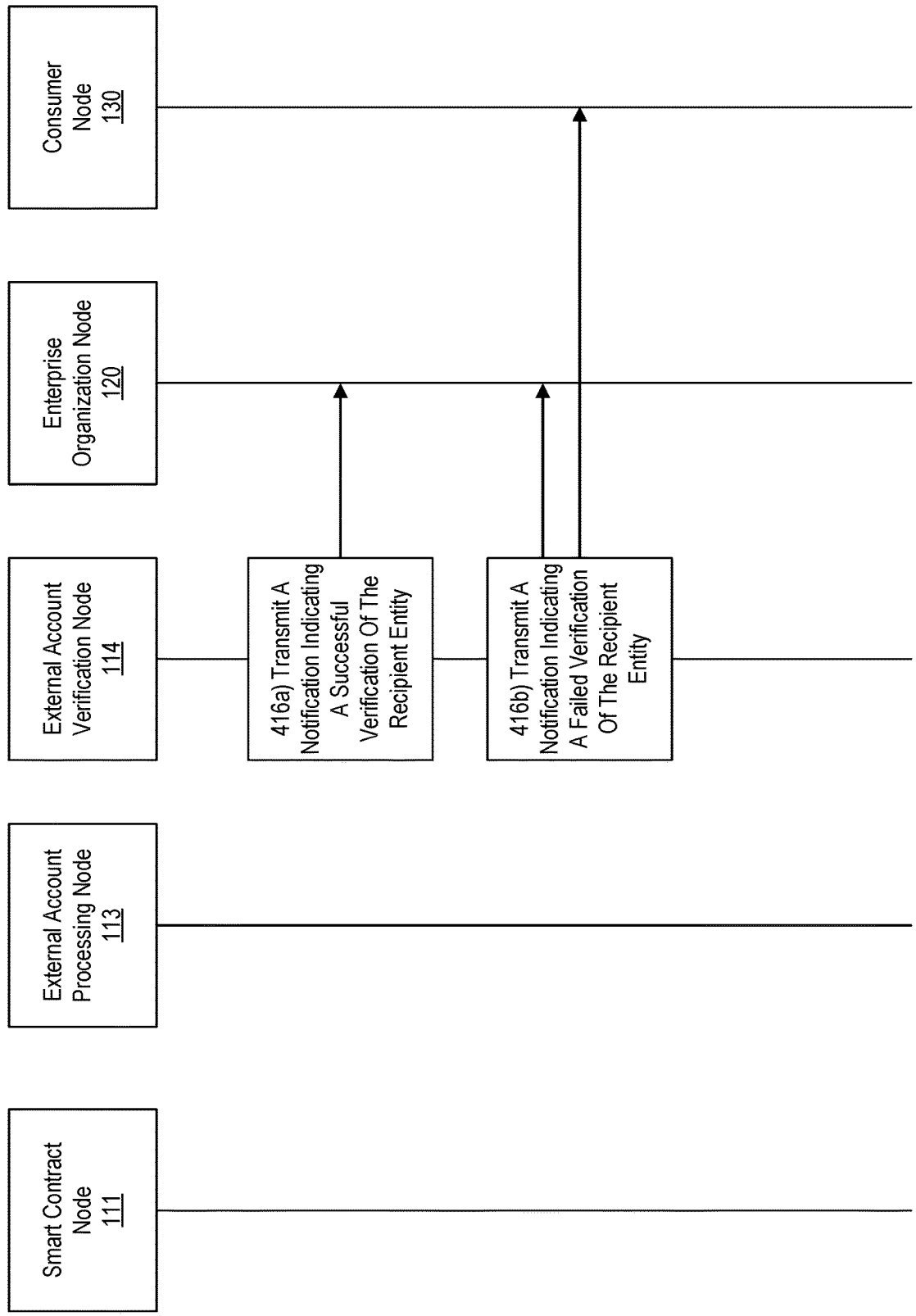

Referring to FIG. 4E, at step 416a, external account verification node 114 may determine that the trust score associated with the entity meets or exceeds the confidence threshold value. Meeting or exceeding the confidence threshold value may indicate that the entity, the recipient account associated with the entity, and the external accounts associated with the entity each satisfy the enterprise-specific guidelines set forth by the enterprise organization.

Based on determining that the trust score meets or exceeds the confidence threshold value, external account verification node 114 may transmit, to enterprise organization node 120, a notification indicating a successful verification of the entity associated with the recipient account and of the recipient account. Based on receiving the notification indicating the successful verification of the entity, enterprise organization node 120 may approve the consumer request to initiate a transaction with the entity.

Alternatively, at step 416b, external account verification node 114 may determine that the trust score associated with the entity fails to meet the confidence threshold value. Failure to meet the confidence threshold value may indicate that at least one of the entity, the recipient accounts associated with the entity, or the external accounts associated with the entity fails to satisfy the enterprise-specific guidelines set forth by the enterprise organization.

Based on determining that the trust score fails to meet the confidence threshold value, external account verification node 114 may transmit, to enterprise organization node 120, a notification indicating a failed verification of the entity associated with the recipient account and of the recipient account. The notification may also indicate that external account verification node 114 will continuously determine whether an updated trust score meets an updated confidence threshold value. Based on receiving a notification indicating a failed verification of the entity, enterprise organization node 120 may deny the consumer request to initiate a transaction with the entity.

Based on determining that the trust score fails to meet the confidence threshold value, external account verification node 114 may also transmit, to consumer node 130, a notification indicating a failed verification of the entity associated with the recipient account and of the recipient account. The notification may also indicate that the enterprise organization will continue to assess the entity associated with the recipient account. External account verification node 114 may transmit the notification to consumer node 130 via a connection that is established between external account verification node 114 and consumer node 130. The connection may be established across network 140.

Figure 5:
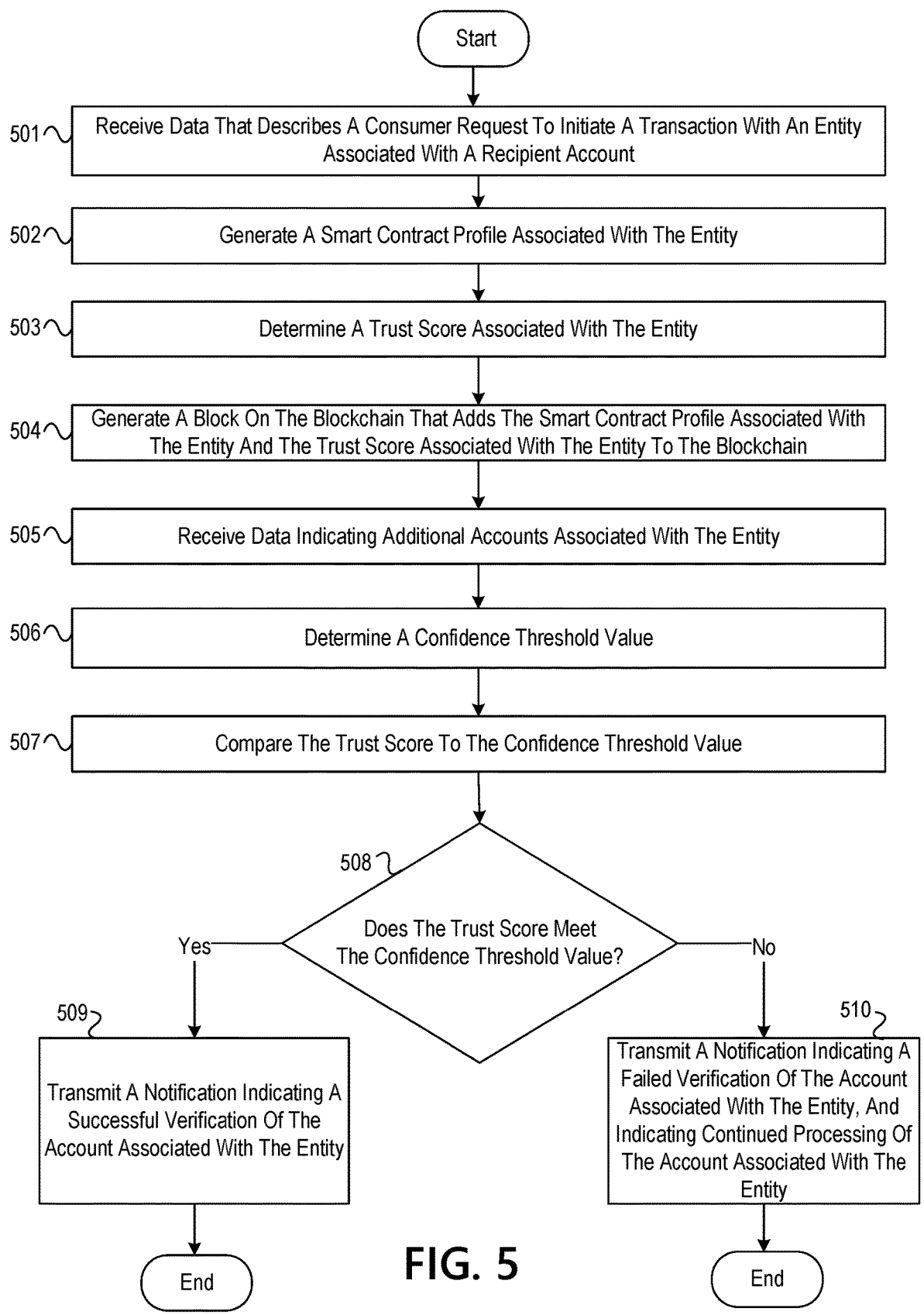
FIG. 5 depicts an illustrative method for verifying external accounts in real-time using dynamic smart contracts in accordance with one or more example embodiments.

FIG. 5 depicts a flow diagram illustrating one example method for verifying external accounts in real-time, or near real-time, using dynamic smart contracts in accordance with one or more aspects described herein. The processes illustrated in FIG. 5 are merely sample processes and functions. The steps shown may be performed in the order shown, in a different order, more steps may be added, or one or more steps may be omitted, without departing from the invention. In some examples, one or more steps may be performed simultaneously with other steps shown and described. Further, one or more steps described with respect to FIG. 5 may be performed in real-time or near real-time.

At step 501, smart contract node 111, of enterprise infrastructure 110, may receive, from enterprise organization node 120, data that describes a consumer request to initiate a transaction with an entity associated with a recipient account. In some examples, smart contract node 111 may be associated with a lightweight node computing device (e.g., lightweight node computing device 250 as described in connection with FIG. 3B). However, smart contract node 111 may be associated with a full node computing device (e.g., full node computing device 210 as described in connection with FIG. 3A), without departing from the description provided herein. In some examples, enterprise organization node 120 may be associated with a full node computing device (e.g., full node computing device 210 as described in connection with FIG. 3A). However, enterprise organization node 120 may be associated with a lightweight node computing device (e.g., lightweight node computing device 250 as described in connection with FIG. 3B), without departing from the description provided herein.

The data received from enterprise organization node 120 may contain information that identifies and describes the consumer associated with the consumer-initiated request as well as information that identifies and describes the entity associated the recipient account. If the consumer is an individual, the data may contain personal identifiable information associated with the consumer (e.g., the consumer's name, the consumer's account number, the consumer's account balance, a listing of the consumer's assets, a listing of previous transactions associated with the consumer, and the like). If the consumer is an organization or institution (e.g., a financial institution), the data may contain information that identifies the organization or institution (e.g., the institution's name, the institution's address, the institution's unique identification number, and the like).

The data may also contain information that identifies and describes the entity associated with the recipient account. If the entity is an individual, the data may contain the personal identifiable information associated with the entity (e.g., the entity's name, the entity's address, the entity's account number, the entity's unique identification number, the entity's phone number, and the like). If the entity is an organization or institution (e.g., a financial institution), the data may contain information that identifies the organization or institution (e.g., the institution's name, the institution's address, the institution's branch code or other location identifier, the organization's identification number, the organization's account number, and the like).

The data may also contain information associated with parameters of the transaction (e.g., the amount of funds to be transferred from the consumer to the entity associated with the recipient account, the accounts that a consumer needs to review prior to granting or denying a loan request, and the like). The data may also contain additional information that the consumer included on the transaction request (e.g., a deadline by which the transaction should be completed, an indication that the consumer is also interested in receiving information about a particular loan repayment process, and the like). Smart contract node 111 may receive the data via a connection that is established between smart contract node 111 and enterprise organization node 120. The connection may be established across network 140.

At step 502, smart contract node 111, of enterprise infrastructure 110, may generate a smart contract profile associated with the entity. To generate a smart contract profile that describes the entity, smart contract node 111 may gather data associated with the entity (e.g., contact information associated with the entity, personal identifiable information associated with the entity, information that describes whether a web-based relationship exists between the consumer and the entity, external accounts associated with the entity, and the like). To populate the smart contract profile, smart contract node 111 may access a contact list associated with a consumer (e.g., consumer node 130). The contact list associated with the consumer may contain information indicating the way in which the consumer communicates with the entity (e.g., a telephone number, an email address, a mailing address, and the like). Smart contract node 111 may extract the information within the consumer's contact list that identifies a method of communication between the consumer and the entity, and may extract the contact information associated with the entity. Smart contract node 111 may add the extracted contact information to the smart contract profile associated with the entity. Smart contract node 111 may monitor the contact list associated with the consumer to identify changes to the contact list. Smart contract node 111 may update the smart contract profile associated with the entity as the data within the contact list changes.

Smart contract node 111 may request access to the enterprise organization reference database 115. Enterprise organization reference database 115 may store enterprise-specific records that are associated with the entity (e.g., a listing of account numbers associated with the entity, a listing of successful transactions associated with the entity, a listing of failed transactions associated with the entity, and the like). Smart contract node 111 may retrieve, from enterprise organization reference database 115, the enterprise-specific records that are associated with the entity, and may add the enterprise-specific records to the smart contract profile associated with the entity. Smart contract node 111 may monitor enterprise organization reference database 115 and may identify changes to enterprise organization reference database 115. Smart contract node 111 may update the smart contract profile associated with the entity in accordance with changes to the enterprise-specific records within enterprise organization reference database 115.

Smart contract node 111 may employ data aggregators to explore the relationship between the consumer and the entity on a variety of web-based media (e.g., social media platforms, digital communication platforms, digital entertainment platforms, and the like). The data aggregators may determine whether the consumer and the entity interact on different digital platforms (e.g., share posts via social media platform 1, are friends on social media platform 2, send e-mails using communication platform 1 and communication platform 2, and the like). The data aggregators may determine the extent of the interaction between the consumer and the entity across a variety of digital platforms. If the consumer and the entity do not communicate via a digital platform, the data aggregators may determine that a web-based relationship does not exist between the consumer and the entity. Alternatively, if the consumer and the entity communicate on at least one digital platform, the data aggregators may determine the extent of the web-based relationship between the consumer and the entity.

To determine the extent of the web-based relationship between the consumer and the entity, the data aggregators may weigh the frequency of the communications against the number of digital platforms upon which the consumer and the entity engage. The data aggregators may receive, from smart contract node 111, criteria for determining the extent of the web-based relationship between the consumer and the entity (e.g., whether the consumer and the entity have interacted recently, whether the interactions between the consumer and the entity are active, whether the interactions between the consumer and the entity have ended, and the like).

The data aggregators may determine the number of platforms on which the consumer interacts with the entity associated with the recipient account. For each platform, the data aggregators may determine the frequency with which the consumer and the entity interact (e.g., send and receive daily emails, share weekly posts, share daily business updates, and the like). If the interaction between the consumer and the entity satisfies a predetermined number of predetermined criteria (e.g., whether the consumer and entity remain connected on a social media platform, whether the consumer and the entity have interacted in the past month, and the like), then the data aggregators may use the predetermined criteria to describe the extent of the web-based relationship between the consumer and the entity. For example, the data aggregators may determine that the consumer sent at least one email per day to the entity and received at least one email per day from the entity for the last three months. As such, the data aggregators may determine that a web-based relationship exists between the consumer and the entity, and may determine, based on the daily emails spanning three months, that the relationship is active and continuous.

Alternatively, if the interaction between the consumer and the entity fails to satisfy the predetermined number of the predetermined criteria, then the data aggregators may use the predetermined criteria to describe the extent of the web-based relationship between the consumer and the entity. For example, the data aggregators may determine that the consumer and the entity are not connected on social platforms and do not communicate through e-mail. As such, the data aggregators may determine that a web-based relationship does not exist between the consumer and the entity.

The data aggregators may transmit their determination to smart contract node 111 (e.g., whether or not a web-based relationship exists between the consumer and the entity, and, if a relationship exists, the extent of the relationship). The data aggregators may monitor the web-based relationship between the consumer and the entity, and may identify modifications to the web-based relationship. The data aggregators may report any changes to smart contract node 111. Smart contract node 111 may add the web-based relationship data to the smart contract profile associated with the entity. Smart contract node 111 may continuously update the data indicating the web-based relationship between the consumer and the entity based on new data from the data aggregators.

Smart contract node 111 may add enterprise-specific rules, determined by the enterprise organization, to the smart contract profile associated with the entity. Smart contract node 111 may receive the enterprise-specific rules from enterprise organization node 120. Enterprise organization node 120 may transmit the enterprise-specific rules to smart contract node 111 via a connection between enterprise organization node 120 and smart contract node 111. The connection between enterprise organization node 120 and smart contract node 111 may be established across network 140.

The enterprise-specific rules may indicate the criteria that trust score node 112 should consider when determining a trust score associated with the entity (e.g., whether the entity has an existing account with the enterprise organization, whether the entity's existing accounts are in good standing, and the like). The enterprise-specific rules may also include guidelines that trust score node 112 should follow when determining the trust score associated with the entity (e.g., if the entity has accounts that are not in good standing and accounts that are in good standing, then assign a greater weight to the accounts that are not in good standing). Smart contract node 111 may add the enterprise-specific rules to the smart contract profile associated with the entity. Smart contract node 111 may continuously monitor communication with enterprise organization node 120 to identify changes to the existing enterprise-specific rules. Smart contract node 111 may update the enterprise-specific rules as it receives changes from enterprise organization node 120.

Smart contract node 111 may transmit the smart contract profile to trust score node 112. Trust score node 112 may use the smart contract profile to determine a trust score associated with the entity.

At step 503, trust score node 112, of enterprise infrastructure 110, may determine a trust score associated with the entity. In some examples, trust score node 112 may be associated with a lightweight node computing device (e.g., lightweight node computing device 250 as described in connection with FIG. 3B). However, trust score node 112 may be associated with a full node computing device (e.g., full node computing device 210 as described in connection with FIG. 3A), without departing from the description provided herein.

To determine the trust score associated with the entity, trust score node 112 may receive, from smart contract node 111, the smart contract profile. Trust score node 112 may extract the data within the smart contract profile. Trust score node 112 may use the enterprise-specific rules in the smart contract profile to determine the weight that attaches to the extracted data (e.g., a weight that attaches to the enterprise-specific records that are stored in enterprise organization reference database 115, a weight that attaches to the data indicating a web-based relationship between the consumer and the entity, a weight that attaches to the frequency of communication between the consumer and the entity, and the like). Using the enterprise-specific rules, trust score node 112 may determine a weighted value associated with the extracted data and may combine the weighted values to determine the trust score associated with the entity. Trust score node 112 may continuously determine the trust score associated with the entity such that the trust score represents the most recent data associated with the entity. Trust score node 112 may transmit the trust score to smart contract node 111.

At step 504, smart contract node 111, of enterprise infrastructure 110, may add the smart contract profile and the trust score associated with the entity to the blockchain. The blockchain (e.g., blockchain 226) may include a plurality of blocks (e.g., 227A, 227B, 227C, . . . 227n, wherein block 227A represents the first block of blockchain 226 and block 227n represents the most immediate block of blockchain 226). To add the smart contract profile and the trust score associated with the entity to the blockchain, smart contract node 111 may create a new block (e.g., block 227n of blockchain 226) and may add the new block to the blockchain as the most immediate block of the blockchain. Smart contract node 111 may add the smart contract profile and the trust score associated with the entity to the most immediate block of the blockchain.

Smart contract node 111 may continuously add an updated smart contract profile and an updated trust score to the blockchain as smart contract node 111 determines the updated smart contract profile and receives the updated trust score from trust score node 112. To add the updated smart contract profile and the updated trust score to the blockchain, smart contract node 111 may create a new block (e.g., block 227n of blockchain 226) and may add the new block to the blockchain as the most immediate block of the blockchain. Smart contract node 111 may add the updated smart contract profile and the updated trust score to the most immediate block of the blockchain (e.g., block 227n of blockchain 226). The most immediate block of the blockchain may contain the updated smart contract profile and the updated trust score as well as the data in the preceding blocks that is associated with the entity.

For example, block 227A of blockchain 226 may contain an initial smart contract profile and an initial trust score associated with the entity. Smart contract node 111 may determine that the enterprise-specific records associated with the entity have changed, and may update the smart contract profile associated with the entity to reflect the changes. Smart contract node 111 may transmit, to trust score 112, the updated smart contract profile. Trust score 112 may use the updated smart contract profile to determine an updated trust score and may transmit, to smart contract node 111, the updated trust score. Smart contract node 111 may create block 227B on blockchain 226 and may add the updated smart contract profile and the updated trust score to block 227B. Smart contract node 111 may also add the content of block 227A to block to 227B such that block 227B contains the most recent smart contract profile and trust score associated with the entity, as well as previous smart contract profiles and trust scores associated with the entity.

At step 505, external account processing node 113, of enterprise infrastructure 110, may use data aggregators to identify external accounts associated with the entity. In some examples, external account processing node 113 may be associated with a lightweight node computing device (e.g., lightweight node computing device 250 as described in connection with FIG. 3B). However, external account processing node 113 may be associated with a full node computing device (e.g., full node computing device 210 as described in connection with FIG. 3A), without departing from the description provided herein.

External account processing node 113 may extract, from the smart contract profile associated with the entity, information that identifies and describes the entity. External account processing node 113 may transmit the extracted information to the data aggregators. External account processing node 113 may instruct the data aggregators to use the extracted information to locate and identify external accounts associated with the entity. External account processing node 113 may further instruct the data aggregators to determine whether the extracted information was used to establish an external account (e.g., whether the entity's unique identification number was used to open an external account, whether the entity's organization identification number was used to open an external account, and the like). External account processing node 113 may instruct the data aggregators to collect information associated with identified external accounts (e.g., the organization with which the account is associated, whether the account is in good standing, the account balance, and the like). External account processing node 113 may continuously monitor the smart contract profile associated with the entity to identify changes in the data within the smart contract profile (e.g., a change in the entity's name, discontinued use of the entity's organization identification number, an additional organization identification number associated with the entity, and the like). If there are modifications to the data within the smart contract profile, external account processing node 113 may update the data aggregators on the modifications to the smart contract profile. External account processing node 113 may instruct the data aggregators to use the most recent data to identify external accounts associated with the entity. The data aggregators may continuously monitor whether the entity is associated with external accounts. The data aggregators may continuously inform external account processing node 113 of any external accounts associated with the entity.

At step 506, external account verification node 114, of enterprise infrastructure 110, may determine a confidence threshold value against which the trust score associated with the entity may be measured. In some examples, external account verification node 114 may be associated with a lightweight node computing device (e.g., lightweight node computing device 250 as described in connection with FIG. 3B). However, external account verification node 114 may be associated with a full node computing device (e.g., full node computing device 210 as described in connection with FIG. 3A), without departing from the description provided herein.

The confidence threshold value may indicate the minimum trust score that external account verification node 114 may use to determine the legitimacy of the recipient account associate with the entity and of the entity. To determine a confidence threshold value, external account verification node 114 may receive, from enterprise organization node 120, enterprise-specific guidelines for determining the confidence threshold value. The guidelines from enterprise organization node 120 may indicate characteristics that the external account should satisfy for the enterprise organization to approve the consumer-initiated request. The guidelines from enterprise organization node 120 may also indicate the range of values within which the confidence threshold value may fall (e.g., the confidence threshold value may range from 0 to 100).

External account verification node 114 may analyze the external accounts in accordance with the enterprise-specific guidelines. External account verification node 114 may determine whether each external account associated with the entity satisfies each enterprise-specific guideline. External verification node 114 may assign a weight to each external account which indicates whether the external account satisfies the enterprise-specific guidelines. If the external accounts satisfy at least a predetermined number of the enterprise-specific guidelines, the entity may need to meet a first confidence threshold value (e.g., a low confidence threshold value, a confidence threshold value that is less than 50, or the like). Alternatively, if the external accounts fail to satisfy at least the predetermined number of the enterprise-specific guidelines, the entity may need to satisfy a second confidence threshold (e.g., a confidence threshold value that is higher than the first confidence threshold, a confidence threshold value that is greater than 50, or the like). External account verification node 114 may adjust the confidence threshold value depending on whether the external account satisfies the enterprise-specific guidelines.

At step 507, external account verification node 114, of enterprise infrastructure 110, may compare the trust score to the confidence threshold value.

At step 508, external account verification node 114, of enterprise infrastructure 110, may determine whether the trust score meets the confidence threshold value.

If, at step 508, it is determined that the trust score associated with the entity meets or exceeds the confidence threshold value, at step 509, external account verification node 114, of enterprise infrastructure 110, may transmit, to enterprise organization node 120, a notification indicating a successful verification of the entity associated with the recipient account and of the recipient account. Based on receiving a notification indicating a successful verification of the entity, enterprise organization node 120 may approve the consumer request to initiate a transaction with the entity.

Alternatively, if at step 508, it is determined that the trust score associated with the entity fails to meet the confidence threshold value, at step 510, external account verification node 114, of enterprise infrastructure 110, may transmit, to enterprise organization node 120, a notification indicating a failed verification of the entity associated with the recipient account and of the recipient account. The notification may also indicate that external account verification node 114 will continuously determine whether an updated trust score satisfies an updated confidence threshold value. Based on receiving the notification indicating the failed verification of the entity, enterprise organization node 120 may deny the consumer request to initiate a transaction with the entity.

Based on determining that the trust score fails to meet the confidence threshold, external account verification node 114 may also transmit, to consumer node 130, a notification indicating a failed verification of the entity associated with the recipient account and of the recipient account. The notification may also indicate that the enterprise organization will continue to assess the entity associated with the recipient account. External account verification node 114 may transmit the notification to consumer node 130 via a connection that is established between external account verification node 114 and consumer node 130. The connection may be established across network 140.

Aspects described herein provide real-time, or near real-time, verification of external accounts. Accordingly, the aspects described may permit a financial institution to make real-time, or near real-time, decisions regarding consumer requests to initiate transactions with an entity associated with the recipient account. Further, arrangements described herein may verify the legitimacy of the recipient account and the entity associated with the recipient account without requiring additional documentation or additional transactions from the consumer. Further still, arrangements described herein may provide for secure sharing and transmission of external account information.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an enterprise computing platform, or as one or more non-transitory computer-readable media storing instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space).

As described herein, the various methods and acts may be operative across one or more computing servers and one or more networks. The functionality may be distributed in any manner, or may be located in a single computing device (e.g., a server, a consumer computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
at a computing device configured to operate in a decentralized peer-to-peer (P2P) network having a plurality of geographically distributed computing devices and the computing device including at least one or more processors and memory storing at least a portion of a blockchain of the P2P network:
receiving data that describes a consumer request to initiate a transaction with an entity associated with an account, wherein receiving the data includes receiving a request to execute network functions including the transaction broadcast by a lightweight node of the P2P network and wherein the request to execute the network functions is digitally signed by the lightweight node using public/private key information associated with the lightweight node;
generating, using the received data that describes the consumer request, a smart contract entity profile associated with the entity associated with the account, wherein generating the smart contract entity profile includes monitoring one or more digital platforms to identify digital interactions between a consumer associated with the consumer request to initiate the transaction and the entity to identify an extent of web-based relationships between the consumer and the entity, wherein generating the smart contract entity profile further includes retrieving, from the lightweight node, a contact list including one or more channels of communication between the consumer and the entity;
determining, based on the smart contract entity profile, a trust score associated with the entity associated with the account;
receiving data indicating additional accounts associated with the entity;
determining, based on the data indicating the additional accounts associated with the entity, a confidence threshold value;
transmitting, to the memory storing at least the portion of the blockchain, the smart contract entity profile associated with the entity associated with the account and the trust score associated with the entity associated with the account;

generating, on the blockchain of the P2P network, a block containing the smart contract entity profile associated with the entity associated with the account and the trust score associated with the entity associated with the account;
comparing the trust score to the confidence threshold value;
transmitting a notification, wherein the notification indicates one of:
  a successful verification of the account associated with the entity; or
  a failed verification of the account associated with the entity;
continuing to monitor the one or more digital platforms to identify a change in the web-based relationships between the consumer and the entity; and
responsive to identifying the change, updating the smart contract entity profile.

2. The method of claim 1, wherein the generating the smart contract entity profile further comprises analyzing data associated with the entity, wherein the data includes one or more of:
  personal identifiable information associated with the entity;
  and
  account data associated with an enterprise organization and the entity.

3. The method of claim 2, wherein the determining the trust score comprises:
  assigning a weight to each element within the data; and
  combining weighted scores of each element within the data.

4. The method of claim 1, further comprising determining the confidence threshold value based on guidelines determined by an enterprise organization, wherein:
  satisfying the guidelines decreases the confidence threshold value; and
  failing to satisfy the guidelines increases the confidence threshold value.

5. The method of claim 1, wherein the confidence threshold value indicates a minimum trust score that is needed to verify the account associated with the entity.

6. The method of claim 1, further comprising transmitting, to an enterprise organization and based on the successful verification of the account associated with the entity, a notification indicating that the enterprise organization can process the consumer request to initiate the transaction with the entity associated with the account.

7. The method of claim 1, further comprising:
  based on the failed verification of the account associated with the entity, performing continuous verification processes on the entity; and
  based on the failed verification of the account associated with the entity, notifying a consumer that the consumer request cannot be completed.

8. A computing platform comprising:
  at least one processor;
  a communication interface communicatively coupled to the at least one processor; and
  memory storing at least a portion of a blockchain in a decentralized peer-to-peer (P2P) network having a plurality of geographically distributed computing devices and computer-readable instructions that, when executed by the at least one processor, cause the computing platform to:
    receive data that describes a consumer request to initiate a transaction with an entity associated with an account, wherein receiving the data includes receiving a request to execute network functions including the transaction broadcast by a lightweight node of the P2P network and wherein the request to execute the network functions is digitally signed by the lightweight node using public/private key information associated with the lightweight node;
    generate, using the received data that describes the consumer request, a smart contract entity profile associated with the entity associated with the account, wherein generating the smart contract entity profile includes monitoring one or more digital platforms to identify digital interactions between a consumer associated with the consumer request to initiate the transaction and the entity to identify an extent of web-based relationships between the consumer and the entity, wherein generating the smart contract entity profile further includes retrieving, from the lightweight node, a contact list including one or more channels of communication between the consumer and the entity;
    determine, based on the smart contract entity profile, a trust score associated with the entity associated with the account;
    receive data indicating additional accounts associated with the entity;
    determine, based on the data indicating the additional accounts associated with the entity, a confidence threshold value;
    transmit, to the memory storing at least the portion of the blockchain in the P2P network, the smart contract entity profile associated with the entity associated with the account and the trust score associated with the entity associated with the account;
    generate, on the blockchain in the P2P network, a block containing the smart contract entity profile associated with the entity associated with the account and the trust score associated with the entity associated with the account;
    compare the trust score to the confidence threshold value;
    transmit a notification, wherein the notification indicates one of:
      a successful verification of the account associated with the entity; or
      a failed verification of the account associated with the entity;
    continue monitoring the one or more digital platforms to identify a change in the web-based relationships between the consumer and the entity; and
    responsive to identifying the change, update the smart contract entity profile.

9. The computing platform of claim 8, wherein the generating the smart contract entity profile further comprises analyzing data associated with the entity, wherein the data includes one or more of:
  personal identifiable information associated with the entity;
  and
  account data associated with an enterprise organization and the entity.

10. The computing platform of claim 9, wherein the determining the trust score comprises:
  assigning a weight to each element within the data; and
  combining weighted scores of each element within the data.

11. The computing platform of claim 8, wherein the instructions, when executed, further cause the computing platform to determine the confidence threshold value based on guidelines determined by an enterprise organization, wherein:
   satisfying the guidelines decreases the confidence threshold value; and
   failing to satisfy the guidelines increases the confidence threshold value.

12. The computing platform of claim 8, wherein the confidence threshold value indicates a minimum trust score that is needed to verify the account associated with the entity.

13. The computing platform of claim 8, wherein the instructions, when executed, further cause the computing platform to transmit, to an enterprise organization and based on the successful verification of the account associated with the entity, a notification indicating that the enterprise organization can process the consumer request to initiate the transaction with the entity associated with the account.

14. The computing platform of claim 8, wherein the instructions, when executed, further cause the computing platform to:
   based on the failed verification of the account associated with the entity, perform continuous verification processes on the entity; and
   based on the failed verification of the account associated with the entity, notify a consumer that the consumer request cannot be completed.

15. One or more non-transitory computer-readable media storing instructions that, when executed by a computing platform comprising at least one processor, memory storing at least a portion of a blockchain in a decentralized peer-to-peer (P2P) network having a plurality of geographically distributed computing devices, and a communication interface, cause the computing platform to:
   receive data that describes a consumer request to initiate a transaction with an entity associated with an account, wherein receiving the data includes receiving a request to execute network functions including the transaction broadcast by a lightweight node of the P2P network and wherein the request to execute the network functions is digitally signed by the lightweight node using public/private key information associated with the lightweight node;
   generate, using the received data that describes the consumer request, a smart contract entity profile associated with the entity associated with the account, wherein generating the smart contract entity profile includes monitoring one or more digital platforms to identify digital interactions between a consumer associated with the consumer request to initiate the transaction and the entity to identify an extent of web-based relationships between the consumer and the entity, wherein generating the smart contract entity profile further includes retrieving, from the lightweight node, a contact list including one or more channels of communication between the consumer and the entity;
   determine, based on the smart contract entity profile, a trust score associated with the entity associated with the account;
   receive data indicating additional accounts associated with the entity;
   determine, based on the data indicating the additional accounts associated with the entity, a confidence threshold value;
   transmit, to the memory storing at least the portion of the blockchain in the P2P network, the smart contract entity profile associated with the entity associated with the account and the trust score associated with the entity associated with the account;
   generate, on the blockchain in the P2P network, a block containing the smart contract entity profile associated with the entity associated with the account and the trust score associated with the entity associated with the account;
   compare the trust score to the confidence threshold value;
   transmit a notification, wherein the notification indicates one of:
      a successful verification of the account associated with the entity; or
      a failed verification of the account associated with the entity;
   continue monitoring the one or more digital platforms to identify a change in the web-based relationships between the consumer and the entity; and
   responsive to identifying the change, update the smart contract entity profile.

16. The one or more non-transitory computer-readable media of claim 15, wherein the generating the smart contract entity profile further comprises analyzing data associated with the entity, wherein the data includes one or more of:
   personal identifiable information associated with the entity;
   and
   account data associated with an enterprise organization and the entity.

17. The one or more non-transitory computer-readable media of claim 16, wherein the determining the trust score comprises:
   assigning a weight to each element within the data; and
   combining weighted scores of each element within the data.

18. The one or more non-transitory computer-readable media of claim 15, wherein the confidence threshold value indicates a minimum trust score that is needed to verify the account associated with the entity.

19. The one or more non-transitory computer-readable media of claim 15, wherein the instructions, when executed, further cause the computing platform to transmit, to an enterprise organization and based on the successful verification of the account associated with the entity, a notification indicating that the enterprise organization can process the consumer request to initiate the transaction with the entity associated with the account.

20. The one or more non-transitory computer-readable media of claim 15, wherein the instructions, when executed, further cause the computing platform to:
   based on the failed verification of the account associated with the entity, perform continuous verification processes on the entity; and
   based on the failed verification of the account associated with the entity, notify a consumer that the consumer request cannot be completed.

* * * * *